(12) United States Patent
Graovac et al.

(10) Patent No.: US 8,829,723 B2
(45) Date of Patent: *Sep. 9, 2014

(54) CIRCUIT ARRANGEMENT INCLUDING A MULTI-LEVEL CONVERTER

(71) Applicant: Infineon Technologies AG, Neubiberg (DE)

(72) Inventors: Dusan Graovac, Munich (DE); Andreas Pechlaner, Dietramszell (DE); Benno Koeppl, Markt Indersdorf (DE)

(73) Assignee: Infineon Technologies AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 13/746,117

(22) Filed: Jan. 21, 2013

(65) Prior Publication Data

US 2013/0127251 A1 May 23, 2013

Related U.S. Application Data

(63) Continuation of application No. 12/706,430, filed on Feb. 16, 2010, now Pat. No. 8,395,280.

(51) Int. Cl.
*H02J 1/00* (2006.01)
*H02J 3/00* (2006.01)

(52) U.S. Cl.
USPC .......................................................... 307/82

(58) Field of Classification Search
USPC .............................. 307/10.1, 43, 82; 363/71
See application file for complete search history.

(56) References Cited

U.S. PATENT DOCUMENTS

| | | | |
|---|---|---|---|
| 5,642,275 A | 6/1997 | Peng et al. | |
| 5,933,339 A | 8/1999 | Duba et al. | |
| 6,058,032 A | 5/2000 | Yamanaka et al. | |
| 6,236,580 B1 | 5/2001 | Aiello et al. | |
| 8,395,280 B2 * | 3/2013 | Graovac et al. | 307/82 |
| 2007/0147098 A1 | 6/2007 | Mori et al. | |
| 2008/0080212 A1 | 4/2008 | Grbovic | |
| 2010/0060235 A1 | 3/2010 | Dommaschk et al. | |

OTHER PUBLICATIONS

Tolbert et al., "Charge Balance Control Schemes for Cascade Multilevel Converter in Hybrid Electric Vehicles," IEEE Transactions on Industrial Electronics, vol. 49, No. 5, Oct. 2002, pp. 1058-1064.

* cited by examiner

*Primary Examiner* — Carlos Amaya
(74) *Attorney, Agent, or Firm* — Slater & Matsil, L.L.P.

(57) ABSTRACT

In accordance with an embodiment, a method of operating a multi-level converter includes detecting a charge state of charge storage units of series connected converter units, assigning parameter sets to the converter units based on the detected charge states, and generating control signals coupled to switch arrangements of the converter units based on the parameter sets.

20 Claims, 17 Drawing Sheets

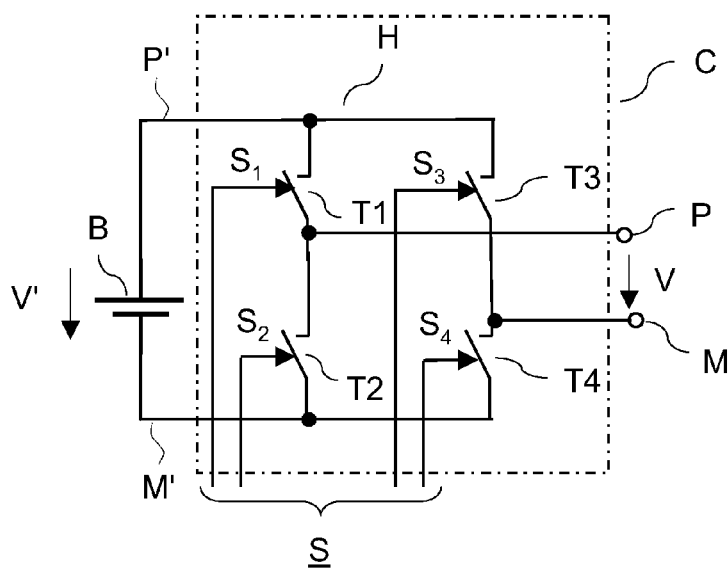
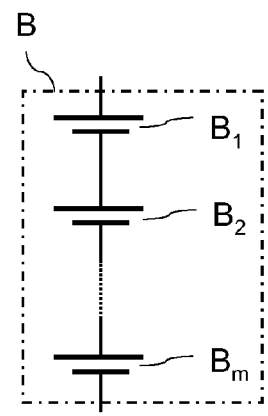
FIG 2
FIG 3
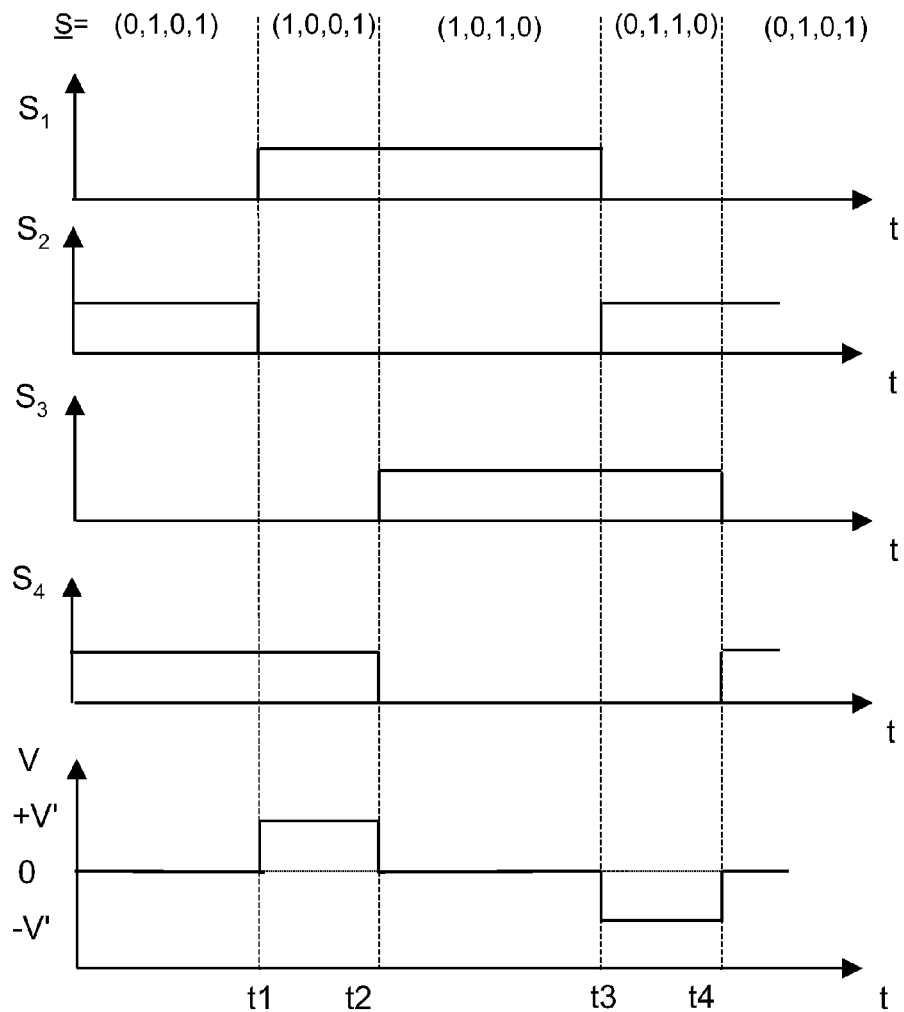
FIG 4

| C1 | $D1_0$ | $D1_0$ | $D5_0$ | $D5_0$ | $D4_0$ |
|----|--------|--------|--------|--------|--------|
| C2 | $D2_0$ | $D2_0$ | $D1_0$ | $D1_0$ | $D5_0$ |
| C3 | $D3_0$ | $D3_0$ | $D2_0$ | $D2_0$ | $D1_0$ |
| C4 | $D4_0$ | $D4_0$ | $D3_0$ | $D3_0$ | $D2_0$ |
| C5 | $D5_0$ | $D5_0$ | $D4_0$ | $D4_0$ | $D3_0$ |
|    | T      | T      | T      | T      | T      |

FIG 7A

| C1 | $D1_0$ | $D5_0$ | $D4_0$ | $D3_0$ | $D2_0$ |
|----|--------|--------|--------|--------|--------|
| C2 | $D2_0$ | $D1_0$ | $D5_0$ | $D4_0$ | $D3_0$ |
| C3 | $D3_0$ | $D2_0$ | $D1_0$ | $D5_0$ | $D4_0$ |
| C4 | $D4_0$ | $D3_0$ | $D2_0$ | $D1_0$ | $D5_0$ |
| C5 | $D5_0$ | $D4_0$ | $D3_0$ | $D2_0$ | $D1_0$ |
|    | T      | T      | T      | T      | T      |

CIRCUIT ARRANGEMENT INCLUDING A MULTI-LEVEL CONVERTER

This is a continuation application of U.S. patent application Ser. No. 12/706,430, entitled "Circuit Arrangement Including a Multi-Level Converter," which was filed on Feb. 16, 2010, and which is hereby incorporated herein by reference in its entirety.

TECHNICAL FIELD

Embodiments of the present disclosure relate to a circuit arrangement including a multi-level converter.

BACKGROUND

Electric vehicles or hybrid vehicles include a converter that converts a DC voltage provided by a battery arrangement into at least one AC voltage required by an electric motor that drives the vehicle. The battery arrangement includes a number of battery cells, which are usually rechargeable cells, such as lithium-ion cells.

According to a first known concept, a number of battery cells are connected in series, where a DC supply voltage is provided by this series arrangement. A DC/AC inverter receives the DC supply voltage and generates an AC supply voltage from the DC voltage. Here, the inverter has to be adapted to compensate for voltage variations occurring in the DC supply voltage. Such voltage variations may occur due to discharging the battery cells during operation.

According to a second known concept, a DC/DC converter is connected between the battery arrangement and the DC/AC inverter. The DC/DC converter is adapted to provide a constant DC supply voltage to the DC/AC inverter, and therefore compensates for voltage variations in the voltage provided by the battery arrangement. However, providing the DC/DC converter adds to the complexity of the system.

Most types of accumulator cells, such as lithium-ions cells, should not be discharged below a lower voltage limit, in order to prevent degradation or damage. In order to prevent improper discharging of individual accumulator cells cell-balancing schemes can be applied. Such balancing schemes involve discharging more highly charged cells to the benefit of less charged cells. Circuit arrangements for performing cell balancing schemes are required in addition to the DC/AC inverter.

SUMMARY OF THE INVENTION

A first aspect of the present disclosure relates to a circuit arrangement including a multi-level converter. The multi level converter includes: voltage supply terminals adapted to provide an AC output voltage; at least two converter units, each converter unit including input terminals adapted to have an electrical charge storage unit connected thereto, output terminals, and a switch arrangement connected between the input and the output terminals, the switch arrangement being adapted to receive a control signal, and being adapted to provide a pulse-width modulated output voltage having a duty cycle at the output terminals dependent on the control signal, the at least two converter units being connected in series with each other between the voltage supply terminals; and a control circuit adapted to generate the control signals for the at least two converter units such that the duty cycle of the output voltages of the at least two converter units is dependent on a desired frequency of the AC output voltage, and is dependent on at least one of a cycle parameter, or a charge state of the charge storage units.

BRIEF DESCRIPTION OF THE DRAWINGS

Examples will now be explained with reference to the drawings. The drawings serve to illustrate the basic principle, so that only aspects necessary for understanding the basic principle are illustrated. The drawings are not to scale. In the drawings the same reference characters denote like signals and circuit components.

FIG. 2 illustrates an embodiment of the converter units;

FIG. 3 illustrates an embodiment of the charge storage unit;

FIG. 4 shows timing diagrams that illustrate the operating principle of one converter unit;

FIGS. 7A-7B illustrate the operating principle of a multi-level converter that cyclically varies the duty-cycle of its converter stages;

DETAILED DESCRIPTION OF ILLUSTRATIVE EMBODIMENTS

Figure 1:
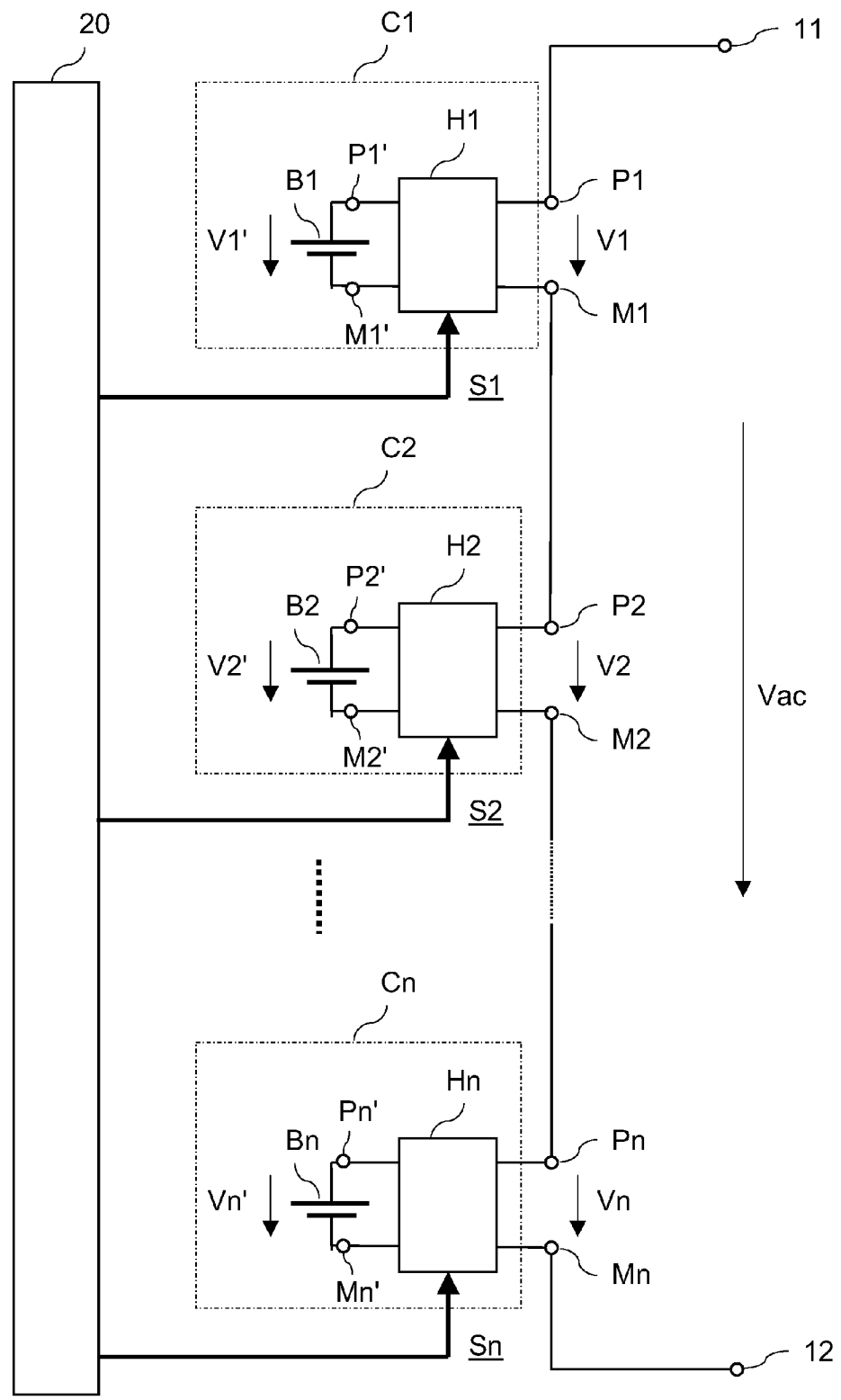
FIG. 1 illustrates a circuit arrangement that includes one converter branch having a multi-level converter with a plurality of converter units.

FIG. 1 schematically illustrates a circuit arrangement that includes a multi-level converter. The multi-level converter includes voltage supply terminals 11, 12 adapted to provide an AC output voltage Vac, and a plurality of at least two converter units. In the present example the multi-level converter includes three converter units C1, C2, Cn. However, this is only an example. It goes without saying that any number higher than one of converter units can be provided.

Each of the converter units C1, C2, Cn includes: input terminals P1', M1', . . . , Pn', Mn' that are adapted to have an electrical charge storage unit B1, B2, Bn connected thereto; output terminals P1, M1, P2, M2, Pn, Mn; and a switch arrangement H1, H2, Hn connected between the input and the output terminals. Each of the switch arrangements H1, H2, Hn receives a control signal S1, S2, Sn and is adapted to provide a pulse-width modulated output voltage V1, V2, Vn at the output terminals P1, M1, P2, M2, Pn, Mn, with the duty-cycle of each of these output voltages V1, V2, Vn being dependent on one of the control signals S1, S2, Sn.

The converter stages form a cascade arrangement between the output terminals 11, 12. For this, one of the converter stages, such as the first converter stage C1, has a first output terminal P1 connected to the first output terminal 11, the other converter stages, such as converter stages C2, Cn, have their first output terminals P2, Pn connected to the second output terminals of another converter stage, and one of the converter stages, such as the third converter stage Cn, has a second output terminal Mn connected to the second output terminal 12.

The control signals S1, S2, Sn are provided by a control circuit 20. Control circuit 20 is adapted to generate the control signals S1, S2, Sn such that the output voltage Vac is an oscillating voltage. The output voltage Vac is the sum of the individual output voltages V1, V2, Vn of the individual converter stages C1, C2, Cn.

In order to ease understanding of the functionality of the converter stages C1, C2, Cn illustrated in FIG. 1, FIG. 2 schematically illustrates an embodiment of one converter stage C. Converter stage C is representative of any of the converter stages C1, C2, Cn illustrated in FIG. 1. H designates the switch arrangement, B designates the charge storage unit, P and M designate the output terminals, V' is the input voltage of the converter stage C, and V is its output voltage. S is the control signal that governs the generation of the output voltage from the input voltage V'.

According to the embodiment illustrated in FIG. 2 the switch arrangement H includes four switches T1, T2, T3, T4 that form an H-bridge connected between the input terminals P', M' and the output terminals P, M. The H-bridge circuit includes a first switch T1 connected between the first input terminal P' and the first output terminal P, a second switch T2 connected between the second input terminal M' and the first output terminal P, a third switch T3 connected between the first input terminal P' and the second output terminal M, and a fourth switch T4 connected between the second input terminal M' and the second output terminal M. Control signal S includes four sub-signals: a first sub-signal $S_1$ that controls the first switch T1, a second sub-signal $S_2$ that controls the second switch T2, a third sub-signal $S_3$ that controls the third switch T3, and a fourth sub-signal $S_4$ that controls the fourth switch T4.

Switches T1, T2, T3, T4 are, for example, implemented as semiconductor switches, such as bipolar or field-effect transistors. These switches can be implanted as normally-on or as normally-off transistors. According to one embodiment either the upper transistors T1, T3 or the lower transistors T2, T4.

Charge storing unit B can be any charge storing unit that is suitable for storing electrical charge or energy, respectively. According to an embodiment charge storing unit B is a rechargeable charge storing unit, like an accumulator, such as a lithium-ion accumulator. However, any other device that is suitable for storing electrical energy may be used as well. Charge storing unit B may include a single accumulator cell, or, referring to FIG. 3, may include a number of accumulator cells $B_1$, $B_2$, $B_m$ connected in series. The number of cells that are connected in series is dependent on the voltage supplied by one cell, and on the desired maximum supply voltage of the charge storing unit B. In the embodiment according to FIG. 3 a number of single accumulator cells $B_1$, $B_2$, $B_m$ are connected in series. However, it goes without saying that instead of single accumulator cells groups of accumulator cells that each include a number of accumulator cells connected in parallel can be connected in series as well.

The generation of the output voltage V of one converter stage, such as converter stage C illustrated in FIG. 2, will now be explained with reference to FIG. 4. FIG. 4 illustrates a timing diagram of the output voltage V dependent on a timing diagram of the control signal S. For controlling a switch arrangement having an H-bridge, such as the switch arrangement H of FIG. 2, S is comprised of four sub-signals. Timing diagrams for each of these sub-signals $S_1$, $S_2$, $S_3$, $S_4$ are illustrated in FIG. 4. For explanation purposes it may be assumed that each of the sub-signals is a two-valued signal that assumes one of a high-level or a low-level. It may further be assumed for explanation purposes that a particular switch is closed, if its control sub-signal assumes a high-level, and is open if its control sub-signal assumes a low-level. Referring to FIG. 4 control signal S can be considered to be a vector $S=(S_1, S_2, S_3, S_4)$ of sub-signals $S_1, S_2, S_3, S_4$. In the illustration of FIG. 4 a value of "0" at the vector position of a sub-signal represents a low-level of the corresponding sub-signal, and a value of "1" at the vector position of a sub-signal represents a high-level of the corresponding sub-signal. For example, S=(0,1, 0,1) represents a low-level of first signal $S_1$, a high-level of second signal $S_2$, a low-level of third signal $S_3$ and a high-level of fourth signal $S_4$.

The output voltage V can assume one of three different voltage values. For explanation purposes it may be assumed that the switches T1-T4 are ideal switches in which no losses occur in the switched-on state. In this case the output voltage V can be described dependent on the input voltage V' as follows: V=V' when the first and fourth switch T1, T4 are closed and the second and third switch T2, T3 are open, i.e., when S=(1,0,0,1); V=−V' when the second and third switch T2, T3 are closed and the first and fourth switch T1, T4 are open, i.e., when S=(0,1, 1,0). The output voltage V is zero, when either the first and third switches T1, T3, are closed and the second and fourth switches T2, T4 are open, i.e., when S=(1,0, 1,0), or when the second and fourth switches T2, T4 are closed and the first and third switch T1, T3 are open, i.e., when S=(0,1, 0,1).

In the embodiment illustrated in FIG. 4 the output voltage V equals +V' during a time interval between times t1 and t2, and V equals −V' in a second time interval between times t3 and t4. The output voltage V is zero before t1, between t2 and t3, and after t4. The output voltage of zero can be obtained by selecting one of the two signal configurations S=(0,1, 0,1) or S=(1,0, 1,0). However, the sequence of the different signal configurations is, in particular, selected such, that the switching frequency of each of the individual switches T1-T4 is as low as possible.

Figure 5:
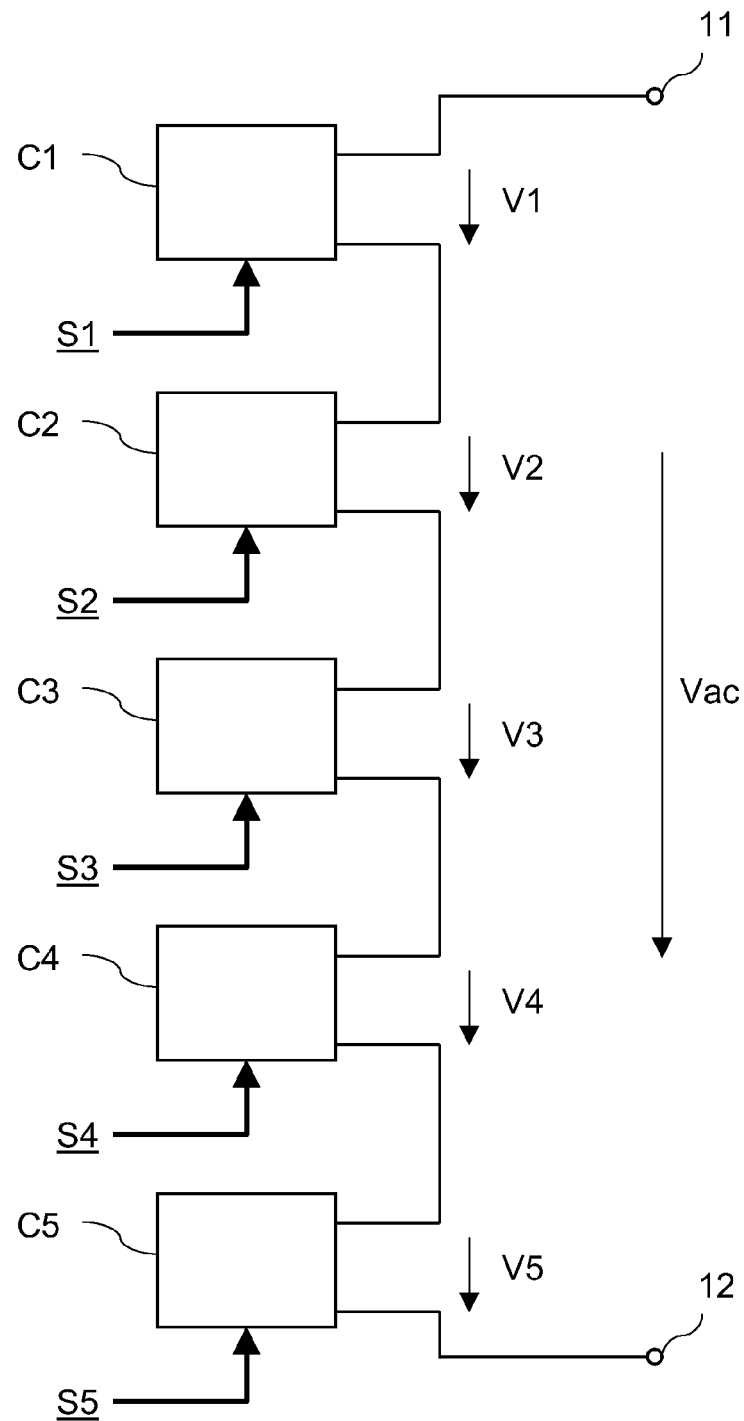
FIG. 5 illustrates an embodiment of a multi-level converter having five converter units.

FIG. 5 schematically illustrates a multi-level converter that includes five converter units C1-C5 connected in series between the output terminals 11, 12. Each of the converter units provides an output voltage V1-V5. The output voltage of the converter Vac is the sum of the five output voltages V1-V5.

Each of the converter units C1-C5 receives a control signal S1-S5 that controls generation of the output voltages V1-V5 from the individual input voltages (not illustrated).

Each of the converter units C1-C5 is adapted to produce an output voltage V1-V5 that can assume one of three different voltage levels. Assuming that the converter stages C1-C5 receive identical input voltages, then these three different voltage levels are: +V', -V', or 0 (zero).

Figure 6:
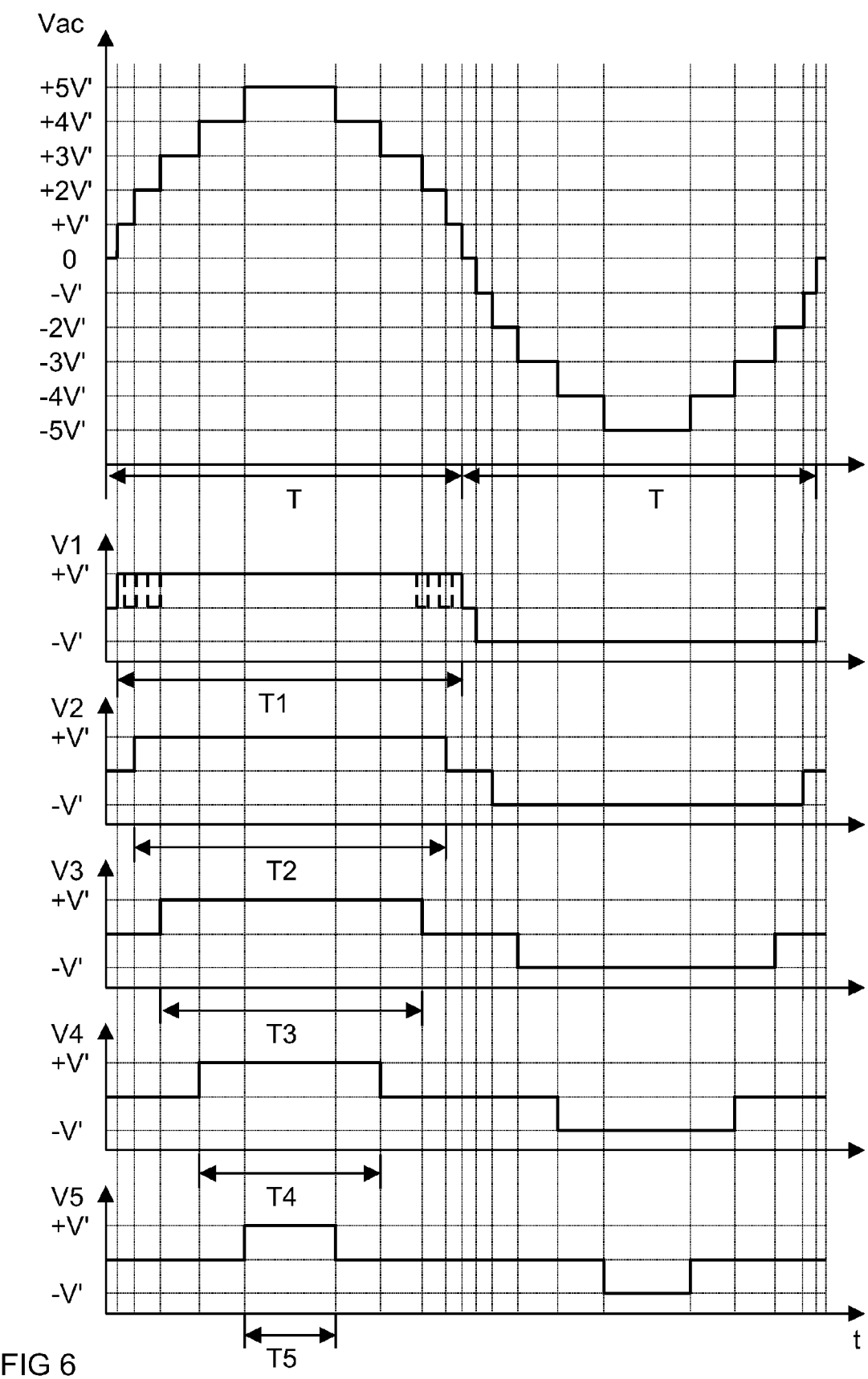
FIG. 6 shows timing diagrams that illustrate the operating principle of the multi-level converter of FIG. 5.

Using a multi-level converter having five converter stages C1-C5, 11 (=2·5+1) different values of the output voltage Vac can be generated. These different voltage levels are illustrated in FIG. 6 and range from -5V' over 0 (zero) to +5V', where V' is the absolute value of the input voltages of the individual converter stages. In this connection it should be mentioned that the input voltages of the individual converter stages may, of course, vary due to variations in the manufacturing process, due to different temperature dependencies, or due to different charging states. Just for the ease of explanation it is assumed that the input voltages of the individual converter stages C1-C5 are identical.

In general, a converter having a number of n converter stages can produce 2n+1 different voltage levels of the output voltage Vac, where these different voltage levels range from -n·d V' over 0 (zero) to +n·V'.

By selecting a suitable time sequence of the individual voltage levels the output voltage Vac of the multi-level converter can approximate a time-continuous signal, in particular, a continuous oscillating signal, such as a signal having a sinusoidal wave form. However, providing a sinusoidal signal as an output signal is only an example. Of course, any other signal, in particular any other periodic signal, such as a signal having a triangular or rectangular waveform or a signal having the waveform of the absolute value of a sinusoidal signal, may be generated as well.

A crucial aspect when providing an output voltage, such as output voltage Vac, from a battery or accumulator arrangement having a number of storage units, such as the arrangement of charge storage units (see B1, B2, Bn in FIG. 1) of the converter stages, is charge balancing. "Charge balancing" means balancing the charges in the individual storage units such that the charging states of the individual storage units do not significantly differ from one another.

Referring to FIGS. 2 and 4, the charge storage unit B is discharged each time the output voltage V equals the positive or the negative supply voltage +V' or -V', respectively. In terms of discharging the charge storage unit B there is no difference between the output voltage V assuming the positive +V' or the negative -V' voltage level. Thus, these voltage levels will commonly be referred to as "discharging levels", because these are the levels at which the charge storage unit B is discharged.

With reference to FIGS. 6 and 7 a method of providing a periodic output voltage using a multi-level converter having five converter stages will now be explained. In the embodiment illustrated in FIG. 6 the output voltage Vac that is to be approximated is a sinusoidal voltage. A sinusoidal voltage has two half-cycles: a positive half-cycle, and a negative half-cycle, each having a time period T. In terms of the overall charge that is taken from the charge storage units when generating the positive half-cycle or the negative half-cycle the positive and the negative half-cycle are equivalent, i.e., the overall charge taken from the overall arrangement of charge storage units is the same during the positive and the negative half-cycle, if a load (not shown) supplied by the output voltage is the same during the positive and the negative half-cycle.

For generating a periodic output voltage Vac the overall arrangement of charge storage units is cyclically discharged, where the duration of one discharge cycle is defined by the desired output voltage. When generating periodic signals having a positive and a negative half-cycle, such as a sinusoidal signal, the duration of a discharge cycle equals the duration of one half-cycle. When generating other periodic signals, the duration of a discharge cycle equals the duration of one cycle of the signal.

FIG. 6, for illustration purposes, illustrates an approximation of a sinusoidal output signal Vac using the eleven different voltage levels of a multi-level converter having five converter stages. In FIG. 6 the approximated sinusoidal signal during the positive and the negative half-cycle is illustrated. Further, in FIG. 6 the timing diagrams of the individual output voltages V1-V5 of the individual converter stages C1-C5 are illustrated.

In order to keep the switching frequencies of the individual output voltages V1-V5 low each output voltage changes its signal level only twice during the positive half-cycle of the sinusoidal signal, namely a first time when the output voltage changes from zero to its positive level +V', and a second time when the output signal changes its signal level back to zero. Equivalently, each of the output voltages changes its signal level twice during the negative half-cycle of the sinusoidal signal, namely a first time when the output voltage changes from zero to its negative value -V', and a second time when the output voltage changes its signal level back to zero. The sinusoidal signal waveform is obtained by superimposing the output voltages V1-V5 of the individual converter stages. Generation of the sinusoidal output voltage Vac during the positive half-cycle will now be explained. Generation of the output signal Vac during the negative half-cycle is equivalent with the difference that the output voltages V1-V5 of the converter stages are positive voltages during the positive half cycle, and are negative voltages during the negative half-cycle.

For approximating a desired output voltage Vac waveform each of the converter stages C1-C5 provides an output voltage V1-V5 that assumes a discharge level (a positive signal level in the positive half-cycle, and a negative signal level in the negative half-cycle) at a given time within the discharge cycle and for a given time duration. The output voltage of each converter stage C1-C5 can, therefore, be described by a set of parameters that defines the time at which the output voltage changes to the discharge level, and the duration for which the discharge level is present. Having a given number of converter stages of a multi-level converter and having a desired output voltage Vac waveform, these sets of parameters for the individual converter stages can easily be calculated. Methods for calculating these parameter sets are commonly known, so that no further explanations are required in this regard.

In FIG. 6 T1-T5 denote the times for which the output voltages V1-V5 of the individual converter stages C1-C5 assume the discharge signal level. It can be seen that these times are different for the individual converter stages C1-C5. Due to this, the individual converter stages C1-C5 are differently discharged in each discharge cycle.

The output voltages V1-V5 have a duty-cycle D1-D5 which is the ratio between the time T1-T5 when the output voltages V1-V5 assume a discharge level in one discharge cycle and the duration T of the discharge cycle, i.e., $$Di = \frac{Ti}{T}, \quad (1)$$

where Ti is the duration when output voltage Vi assumes its discharge level −V', +V', T is the duration of one discharge cycle (i.e., the duration of one half-cycle in the embodiment of FIG. 6), and i is the index indicating the individual output voltages of the individual converter stages Ci of the multi-level converter.

Since the amount of charge that flows from the charge storage unit of one converter Ci stage during one discharge cycle is proportional to the time Ti for which the output voltage Vi assumes the discharge level, the duty cycle Di indicates the amount of charge that flows from the converter stage in one discharge cycle. Due to the different duty-cycles of the output voltages V1-V5 that are required during one discharge cycle in order to approximate the desired output voltage, such as a sinusoidal voltage, the charge storage units of the individual converter stages Ci are differently discharged during each discharge cycle.

In FIG. 6 the output voltages Vi of the converter stages Ci are illustrated to assume the discharge level only once during one discharge cycle. However, this is only an example. According to one embodiment, the output voltages Vi assume a discharge level several times during one discharge cycle. In particular, the output voltages Vi are switched on and off several times in a first and a second transition period. The first transition period is a time period after the output voltage is switched on (i.e., assumes the discharge level) the first time in a discharge period, and the second transition period is the period before the output voltage is finally switched off in one discharge period. This helps smoothing the edges of the output voltage and is illustrated for the output voltage V1 in FIG. 6. However, it is also possible to regularly switch the output voltage of one converter on and off during one discharge cycle in order to, e.g., control the output current of the converter. If the output voltage of one converter assumes the discharge level more than once during one discharge cycle, then Ti in eqn. (1) is replaced by the sum of the time periods in which the output voltage Vi assumes the discharge level in one discharge cycle.

The duty-cycles Di of the individual output voltages Vi are set by the control circuit 20 via the control signals Si (with Si denoting one of the control signals, such as control signals S1-S5, provided by the control circuit 20). Referring to the explanation hereinabove the output voltages Vi of the converter stages Ci that are superposed to generate the output voltage Vac are each defined by a parameter set that, besides others (such as switch on and switch off times of the discharge level), defines the duty cycle of the output voltages Vi. Given a desired output voltage, and given a number of converter stages, control circuit 20 is adapted to provide a number of parameter sets Pi, with the number of parameter sets being equal to the number of converter stages Ci. These parameter sets may, for example, be provided by calculating, or by reading stored parameter set values from a storage device.

Further, given a particular parameter set Pi for a given converter stage Ci the control circuit 20 is adapted to generate the control signal Si of the converter stage such that the converter stage Ci generates the output voltage Vi in accordance with the parameter set Pi.

Control circuit 20 is further adapted to assign the provided parameter sets to the individual converter stage such that a charge balancing of the charge storage units of the converter stages is obtained. In this connection, "assignment of one parameter set to one converter stage" means to generate the control signals of the one converter stage such that the output voltage of the one converter stage is in correspondence with the one parameter set.

Exemplary embodiments for assigning the calculated parameter sets, in particular, the calculated duty-cycles, to the converter stages Ci will now be explained with reference to FIGS. 7A and 7B for a multi-level converter having five converter stages. In this case, control circuit 20 is adapted to provide five parameter sets, where each of these parameter sets includes a duty cycle. These duty-cycles will be referred to as $D1_0, D2_0, D3_0, D4_0, D5_0$ in the following.

According to a first embodiment that is illustrated in FIGS. 7A and 7B the assignment of the provided parameter sets to the converter stages Ci changes cyclically. FIGS. 7A and 7B illustrate the assignment of the duty-cycles $D1_0, D2_0, D3_0, D4_0, D5_0$ (that are part of the parameter sets) to the converter stages Ci for a number of subsequent discharge cycles, each having the duration T.

In the embodiment according to FIG. 7A during a first discharge cycle the first output voltage V1 of the first converter stage C1 has a first duty-cycle value $D1_0$, the second output voltage V2 of the second converter stage C2 has a second value $D2_0$, the third output voltage V3 of the third converter stage C3 has a third value $D3_0$, the fourth output voltage V4 of the fourth converter stage C4 has a fourth value $D4_0$, and the fifth output voltage of the fifth converter stage C5 has a fifth value $D5_0$. In the embodiment according to FIG. 7A the duty-cycles are kept for two subsequent half-cycles, which in case of a sinusoidal output voltage means that the duty-cycles are kept for the positive half-cycle and the negative half-cycle of the output voltage Vac. This is illustrated in FIG. 6.

The duty-cycle values change with the beginning of every second discharge cycle. In the embodiment according to FIG. 7A the duty-cycles periodically change, so that $D1=D5_0$, $D2=D1_0, D3=D2_0, D4=D3_0$, and $D5=D4_0$ with the beginning of the second period, $D1=D4_0, D2=D5_0, D3=D1_0, D4=D2_0$, and $D5=D3_0$, with the beginning of the third period, etc. Thus, periodically the same parameter set is assigned to the individual converter stages.

According to the embodiment illustrated in FIG. 7B the duty-cycles D1-D5 periodically change with every discharge. It should be mentioned in this connection that the number of discharge cycles for which the duty-cycle value of the individual output voltages is kept constant, i.e., the number of discharge cycles after which the duty-cycle values change, is arbitrary. According to further embodiments the duty-cycle values cyclically change after each three, four, five or more discharge cycles.

By cyclically changing the duty-cycles of the different output voltages Vi discharging of the individual charge storage units is balanced.

However, cyclically changing the duty-cycles is only one possible way of balancing the discharging of the individual charge storage units. According to another embodiment the provided parameter sets are randomly assigned to the individual converter stages, where the assignment may change with every n (n≥1) discharge cycle.

According to a further embodiment control circuit 20 is adapted to detect the charging states of the charge storage units, such as charge storage units B1, B2, Bn of FIG. 1, and to assign the provided parameter sets, that include duty-cycle values $D1_0$-$D5_0$, to the individual converter stages dependent on the detected charging states. According to an embodiment, assignment of the parameter sets to the converter stages is performed such that the duty-cycle assigned to a particular converter stage is the lower, the lower the charging state of the charge storage unit of the converter stage is.

The detection of the charging states of the individual charge storage units B1, B2, Bn can be performed in a number of different ways.

According to a first example, the control circuit 20 measures the voltages V1', V2', Vn' across the charge storage units B1, B2, Bn. The higher the charging state is, the higher the measured voltage is.

According to a second example, the control circuit 20 measures the temperatures of the charge storage units B1, B2, Bn. The lower the charging state is, the higher temperature is.

According to a third example the control circuit 20 measures the charge stored in the individual charge storage units by integrating the input and the output current of the individual charge storage units. In this connection it should be mentioned that there is an input current when the charge storage units are charged. Methods for charging the charge storage units will be explained hereinbelow. If the current is permanently integrated starting with a first charging of the charge storage unit, then the integration result is a direct measure of the charging state.

Of course, any other suitable methods for detecting the charging state of the charge storing units B1, B2, Bn may be used as well.

The maximum amplitude of the output voltage Vac is dependent on the number of converter stages that are connected in series, and is dependent on the maximum output voltage of each of the different converter stages. In the embodiment according to FIG. 6 the absolute value of the maximum amplitude is five times the input voltage of the individual converter stages, i.e., 5V', when five converter stages are used. According to a further embodiment, the converter includes more converter stages than required. In this case each time at least one of the converter stages is controlled such that its output voltage is zero, which is equivalent to the fact that each time at least one of the converter stages is bypassed. According to one embodiment, control circuit 20 is adapted to diagnose the charge storage units and is adapted to permanently bypass a charge storage unit that has been identified to be not operative. A charge storage unit implemented as an accumulator cell is, e.g., not operative when it has been discharged to a discharging limit. In order to avoid permanent damage to the accumulator cell discharging below this limit should be avoided.

The capability of bypassing defect or discharged converter stages provides a limp-home mode. Because even when some of the converter stages are bypassed a supply voltage—having a lower maximum voltage—can still be provided to the load.

Figure 8:
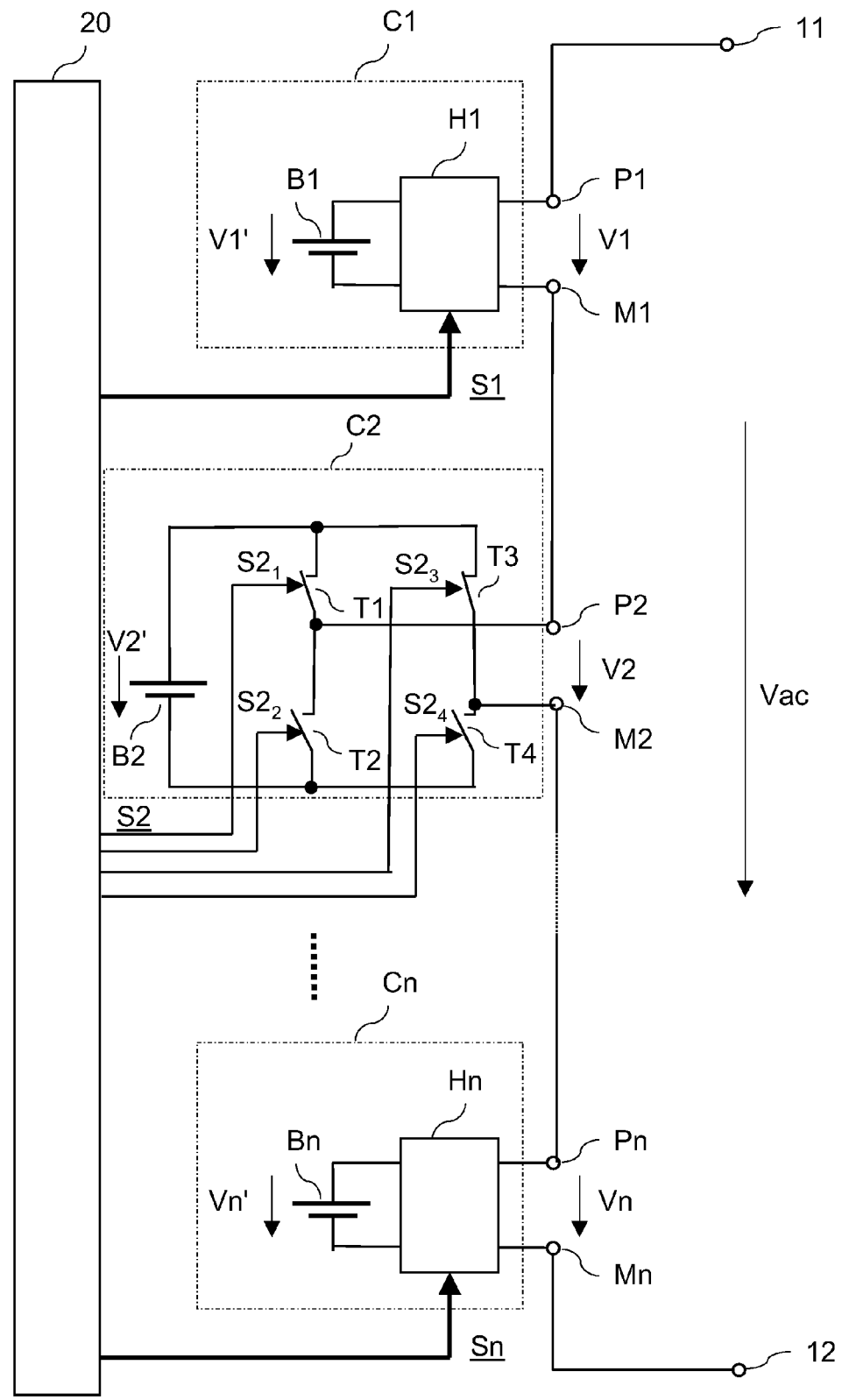
FIG. 8 illustrates a multi-level converter having a plurality of converter units, and being adapted to bypass one of the converter units.

FIG. 8 illustrates a multi-level converter having several converter stages C1, C2, Cn from which one converter C2 is bypassed by electrically connecting its output terminals P2, M2 together. Connecting the output terminals P2, M2 can be performed by closing the first and the third switch T1, T3 under control of their control sub-signals $S2_1$, $S2_3$, or by closing the second and the fourth switch T2, T4 under control of their control sub-signals $S2_2$, $S2_4$. Bypassing the second converter stage C2 is, for example, necessary when a defect or a discharging to the lower limit of its charge storage unit V2' has been detected. A defect or a discharging to the lower limit can, e.g., be detected by detecting the charging state of the charge storage unit.

When the individual charge storage units are working properly bypassing of at least one converter stage can become necessary in order to limit the amplitude of the output voltage to a desired amplitude value. The duty-cycle of the bypassed converter stage is zero. In case that all of the charge storage units are working properly a duty-cycle of zero can be considered to be the duty-cycle of one parameter set of the number of provided parameter sets that are assigned to the individual converter stages in accordance with one of the assignment schemes explained hereinabove.

Using a multi-level converter for generating the output voltage Vac, where each converter stage is connected to a charge storage unit, has the following advantages compared with known voltage generation methods, that use a stack of charge storage units from which a DC/AC inverter generates the oscillating output voltage.

The voltage blocking capability of the switches T1-T4 (see FIG. 2) of the individual converter stages has to be adapted to the input voltages of the converter stages, i.e., to the voltages of the charge storage units. This voltage is, for example, in the range of between 20V and 60V. The voltage blocking capability of the switches T1-T4 of the individual converter stage is, therefore, independent of the output voltage Vac. In motor drive applications the output voltage Vac is, for example, in the range of about 400V. The power losses in an DC/AC inverter generating an oscillating output voltage of several 100V from a DC source such as an accumulator pack, is, however, larger than the sum of power losses that occur in the low-voltage switches of the individual converter stages of a multi-level converter.

Further, even though more switches are required in a multi-level converter compared with a DC/AC converter, the low-voltage switches of the multi-level converter together are significantly cheaper than the high voltage switches required in the DC/AC inverter, so that the overall costs for the multi-level converter are even lower than the costs for the DC/AC converter.

The multi-level converter architecture allows electrical energy to be provided to the individual charge storage units via the output terminals 11, 12. Thus, no additional terminals are required for charging or re-charging the charge storage units. Due to the multi-level converter architecture electrical energy can be selectively provided to the individual charge-storage units, for example, to those charge storage units that have been identified by the control circuit 20 to have the lowest charging state. The electrical energy provided to the output terminals 11, 12 for charging the charge storage unit can be provided by a charging circuit, that will be explained below, or by a load connected to the output terminals 11, 12. The load is, for example, a motor that functions as a motor when a supply voltage is provided by the converter at the output terminals, and that may function as a generator for feeding energy back into the charge storage units.

Due to the low power losses that occur in the individual low voltage switches, and due to the fact that the individual switches are distributed in the multi-level converter, no expensive cooling system is required in order to cool the system.

Finally, continuous oscillating voltages, such as sinusoidal voltages, can be well approximated by the output voltage of a multi-level converter. The Total Harmonic Distortion (THD) of an approximated sinusoidal voltage generated by a multi-level converter having 5 converter stages and providing 11 different output voltage levels is only about 5%. The THD of an approximated sinusoidal voltage generated by a multi-level converter having 11 converter stages and providing 23 (2·11+1) different voltage levels is only about 1%.

Figure 9:
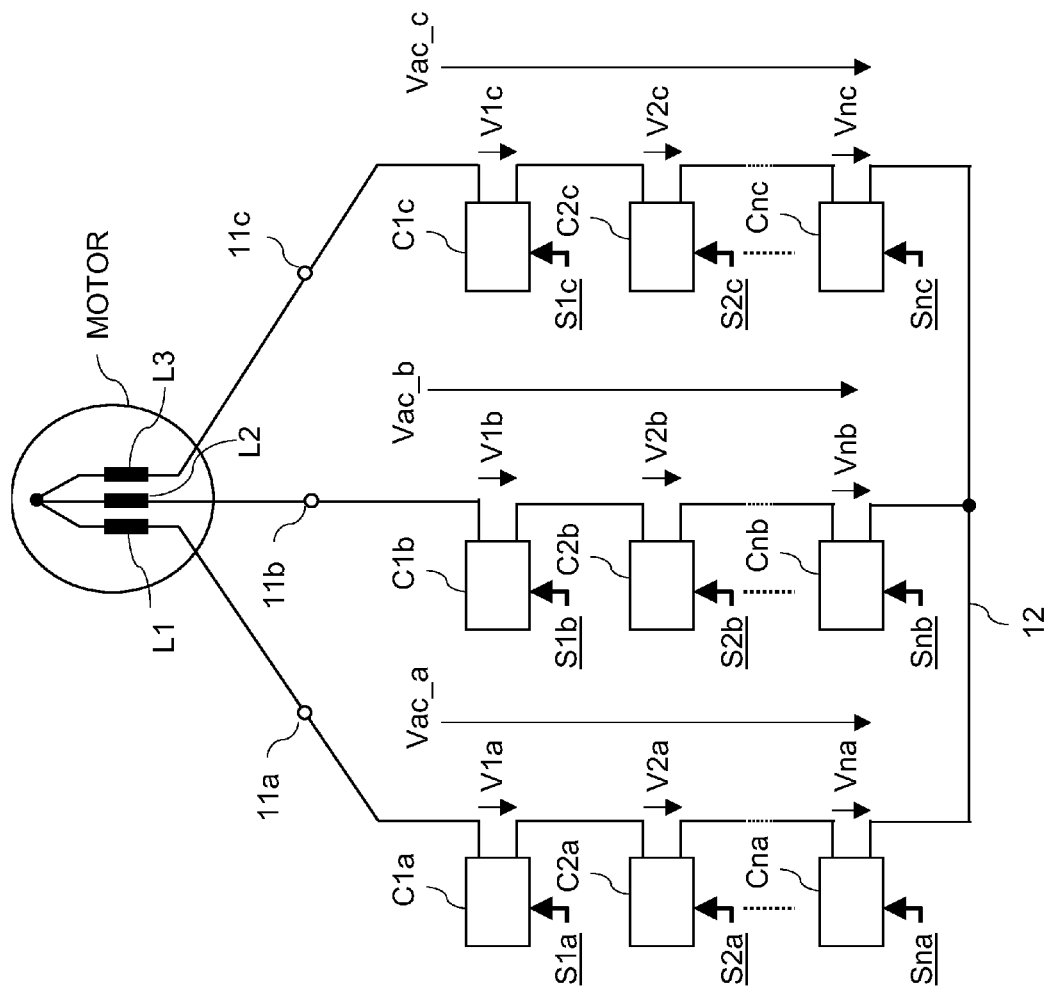
FIG. 9 illustrates a circuit arrangement having three multi-level converters for supplying three output voltages.

The converters illustrated in FIGS. 1, 5 and 8 have one converter branch that includes a multi-level converter. Thus, these converters are adapted to generate one single oscillating output voltage Vac. FIG. 9 illustrates a multi-level converter arrangement that is based on the converters according to FIGS. 1, 5 and 8 and that has three converter branches or three cascades of converter stages, respectively. Each converter branch includes a multi-level converter and provides an oscillating output voltages Vac_a, Vac_b, Vac_c, such as sinusoidal voltages, where the three different output voltages Vac_a, Vac_b, Vac_c are phase-shifted relative to each other. Each of the converter branches is implemented in one of the ways explained before with reference to FIGS. 1 to 8. In FIG. 9 like features of the cascades of converter stages are designated with the same reference characters as in previous FIGS. 1 to 8, where the reference characters of the first cascade that generates the first output voltage Vac_a have an additional "a", the reference characters of the second cascade that generates the second output voltage Vac_b have an additional "b", and the reference characters of the third cascade that generates the output voltage Vac_c have an additional "c". First output terminals 11a, 11b, 11c of the converter branches will be referred to as first, second and third phase-outputs of the multi-level converter arrangement. A three-phase load, such as a motor, can be connected to these outputs. The second outputs of the converter branches are connected together.

A control circuit that generates the control signals S1a-Snc for the individual converter stages is present, but is not illustrated in FIG. 9. The control circuit is adapted to generate the individual control signals S1a-Snc such that at the phase-outputs 11a, 11b, 11c three oscillating output voltages Vac_a, Vac_b, Vac_c that are phase-shifted relative to each other are generated.

As mentioned before the charge-storage units of the individual converter stages can be charged via the output terminals 11, 12 of the converter and the switch arrangements. The basic principle of this will first be explained with reference to FIGS. 1 and 2.

When applying a supply voltage between the output terminals P, M of one converter stage C that is higher than the input voltage V' provided by the charge storage unit B, the charge storage unit B can be charged by controlling the switch arrangement H such that it connects the input terminals P', M' with the output terminals P, M. Assume that the input voltage V' that is to be provided by the charge storage unit B between the first and second input terminals P', M' is a positive voltage, and that the supply voltage applied between the first and second output terminals P, M is also a positive voltage, then the first and fourth switches T1, T4 are closed, controlled by control signal S, in order to charge the charge storage unit B. If the supply voltage is a negative voltage, then the second and third switches T2, T3 are closed in order to charge the charge storage unit B.

In the following, a switching state of the switch arrangement H that allows charging of the charge storage unit B via the output terminals P, M will be referred to as charging state, while a switching state that bypasses the converter unit will be referred to as bypassing state of the switch arrangement. In this connection it should be mentioned that the switching state of the switch arrangement H that allows the charge storage unit B to be charged with a positive supply voltage corresponds to the switching state explained with reference to FIG. 6 in which a converter stage provides a positive output voltage, and a switching state of the switch arrangement H that allows the charge storage unit to be charged with a negative supply voltage corresponds to the switching state explained with reference to FIG. 6 that allows to provide a negative output voltage.

A supply voltage can be applied to the output terminals P, M, of one particular converter stage via the output terminals 11, 12 of the converter and the other converter stage. For charging the charge storage unit of one converter stage, such as the second converter stage C2, for example, the switch arrangement H2 of this converter stage H is in the charging state, while the other converter stages C1, Cn are each either in the bypassing state or in the charging state. If only one converter stage, such as second converter stage C2, is in the charging state, while the other converter stages are in the bypassing state, then the complete supply voltage that is present between the output terminals 11, 12 is applied to the charge storage unit B2 of the converter stage C2. If more than one of the converter stages is in the charging state, then the charge storage unit of these converter stages form a series circuit that is connected between the output terminals 11, 12. Thus, the supply voltage applied to the output terminals 11, 12 is applied across the series circuit of the several charge storage units, so that these several charge storage units are charged at the same time.

A supply voltage can be applied to the output terminals 11, 12 of the converter in many different ways. Some examples for applying a supply voltage to the output terminals to the converter will be explained with reference to FIGS. 10 to 17 in the following.

Figure 10:
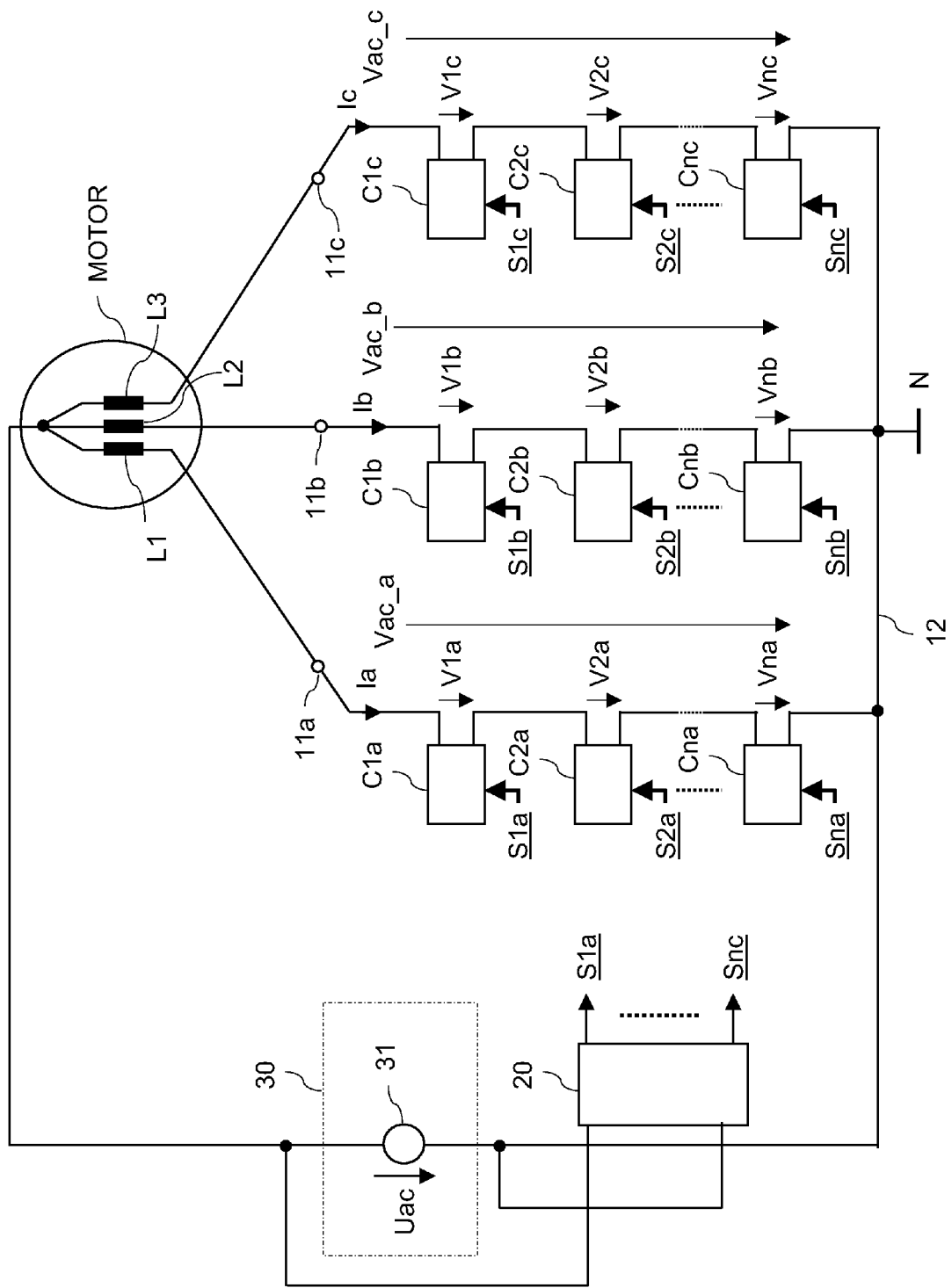
FIG. 10 illustrates a first embodiment of a circuit arrangement having a multi-level converter and having a charging circuit coupled to the multi-level converter.

FIG. 10 illustrates a converter arrangement for supplying three phase-shifted output voltages Vac_a, Vac_b, Vac_c. This converter arrangement further includes a supply voltage arrangement 30 that includes an AC supply voltage source 31. In the embodiment according to FIG. 10 the supply voltage source 31 is connected to the phase-outputs 11a, 11b, 11c via the load (motor), i.e., via a center tap of the load. In the voltage generation mode of the multi-level converter the load is driven by the three phase-shifted output voltages Vac_a, Vac_b, Vac_c provided by the converter arrangement. In the charging mode of the converter arrangement the supply voltage Uac provided by the supply voltage source 31 is coupled to the output terminals 11a, 11b, 11c of the converter arrangement via the three motor windings. For this, one terminal of the supply voltage source 31 is connected to the second terminal 12 of the converter arrangement, and the other terminal is connected to the star-point of the motor.

In the charging mode the charge storage unit in at least one converter stage Ca-Cnc is cyclically charged. The charging process of one converter stage, such as converter stage C2a, for example, will now be explained. A charging cycle first involves each of the converter stages, such as converter stages Ca-Cna, that are connected in series to be in the bypassing state. During this time period the inductor, such as inductor L1, that is connected in series with the bypassed converter stages stores electrical energy. Each charging cycle further includes a time period when at least one of the converter stages is in the charging state. The electrical energy that has before been stored in the inductor, such as inductor L1, is then transferred into the charge storage unit of the at least one converter stage. During this time the converter stages that are not to be charged are in the bypassing state. As explained before, more than one converter stage can be in the charging state at one time, while the remaining converter stages are in the bypassing state.

The charging process, i.e., the transferring of the converter stages in the bypassing state or the charging state is controlled by the control circuit 20. For this, control circuit 20 receives the supply voltage Uac, or a voltage that is proportional to the supply voltage Uac. Based on the information about the instant value of the supply voltage Uac and the information about its polarity, control circuit 20 controls the duration during which the inductor, such as inductor L1, stores electrical energy, and controls the charging state of the converter stage that is to be charged, i.e., controls if the converter stage is in the first charging state for charging with a positive supply voltage, or in a second charging state for charging with a negative supply voltage.

In FIG. 10 Ia, Ib, Ic denote charging currents flowing into the individual branches. According to one embodiment, control circuit 20 is adapted to measure the charging currents Ia, Ib, Ic and is adapted to control charging of the converter branches such that the charging currents Ia, Ib, Ic have given signal waveforms. Through this, a Power Factor Correction or Power Factor Compensation of the power taken from the voltage source 31 can be achieved.

Figure 11:
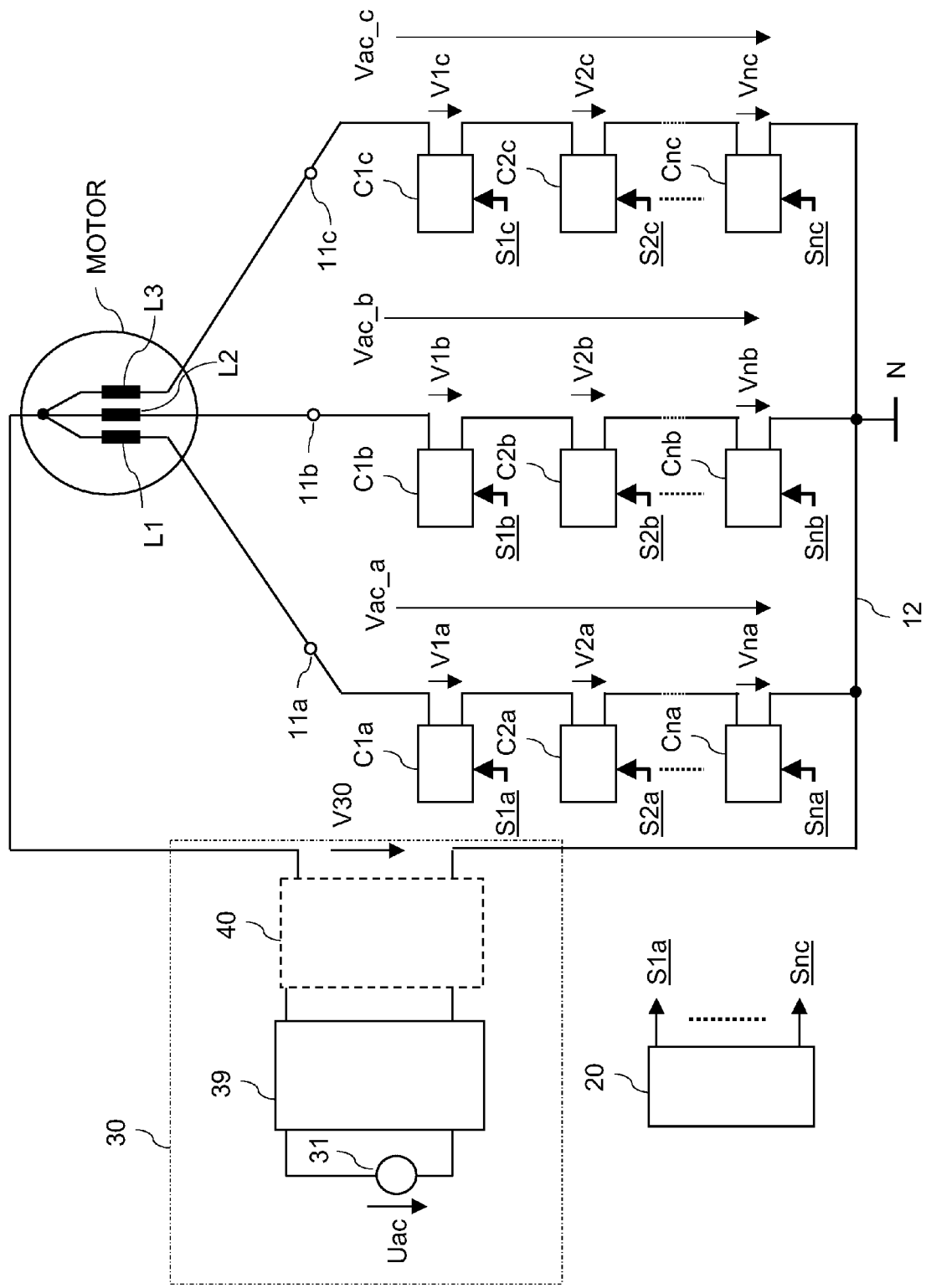
FIG. 11 illustrates a second embodiment of a circuit arrangement having a multi-level converter and having a charging circuit coupled to the multi-level converter.

According to a further embodiment that is illustrated in FIG. 11, the voltage provided to the multi-level converter is a DC voltage V30. DC voltage V30 may be provided by any DC voltage source. In the embodiment illustrated in FIG. 11 the DC voltage V30 is provided by a voltage supply arrangement 30 that includes a supply voltage source 31 supplying an AC supply voltage, an AC/DC converter, such as a Power Factor Controller (PFC), and an optional DC/DC converter 40 connected downstream the AC/DC converter. The supply voltage source 30 provides the DC output voltage V30 that is applied to the phase-outputs 11a, 11b, 11c via the three inductances L1, L2, L3 of the motor. The charging process is identical to the charging process as explained before with reference to FIG. 10, with the difference that in the embodiment according to FIG. 11 the polarity of the supply voltage V30 is not monitored by the control circuit 20, because the supply voltage V30 according to FIG. 11 has always the same polarity and the same amplitude.

Figure 12:
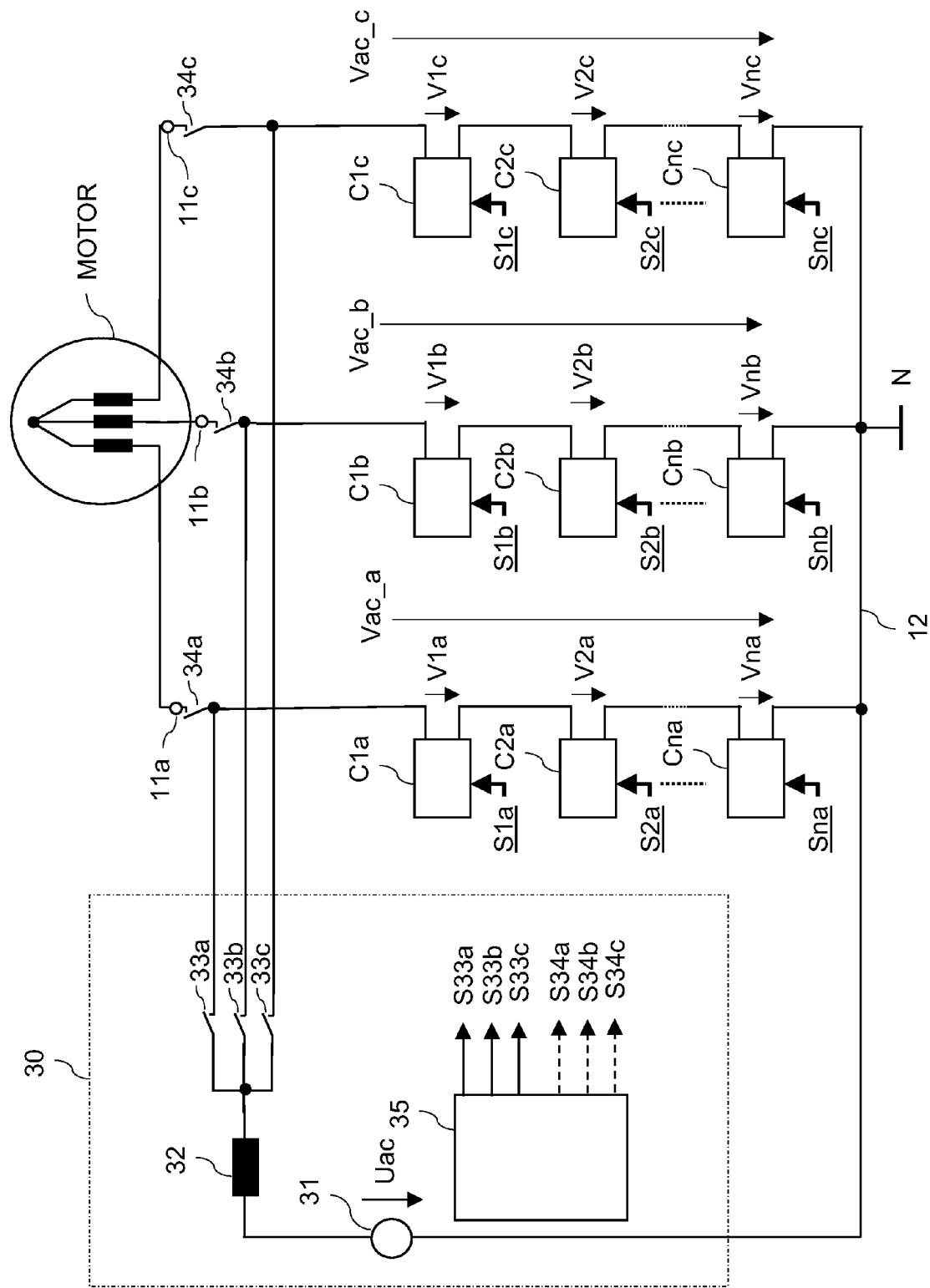
FIG. 12 illustrates a third embodiment of a circuit arrangement having a multi-level converter and having a charging circuit coupled to the multi-level converter.

FIG. 12 illustrates an embodiment of the voltage supply circuit 30 that includes a supply voltage source 31 providing an AC supply voltage, an inductor 32 connected in series with the supply voltage source 31 and three switches 33a, 33b, 33c, with each of these switches connecting the inductor 32 to one of the phase outputs 11a, 11b, 11c. Optionally further switches 34a, 34b, 34c are connected between the phase outputs and the load. These further switches 34a, 34b, 34c serve to disconnect the multi-level converter arrangement from the load during the charging process. The charging process affected by the voltage supply arrangement 30 according to FIG. 12 is equivalent to the charging process that has been explained with reference to FIG. 10, with the difference, that in the arrangement according to FIG. 12 energy provided by the supply voltage source 31 is stored in the additional inductor 32 instead of inductors of the motor. The arrangement according to FIG. 12 allows to selectively charge the inductive storage units of one converter branch by selectively closing one or more of the switches 33a, 33b, 33c. A control circuit 35 that is schematically illustrated in FIG. 12 controls the switching position of switches 33a, 33b, 33c and of the additional switches 34a, 34b, 34c by control signals S33a-S34c.

While in the embodiments of FIGS. 10 and 11 a center tap of the motor is required, no center tap is required in the embodiment of FIG. 12 in which the charging circuit or voltage supply arrangement 30 is directly coupled to the input terminals 11, 12.

Figure 13:
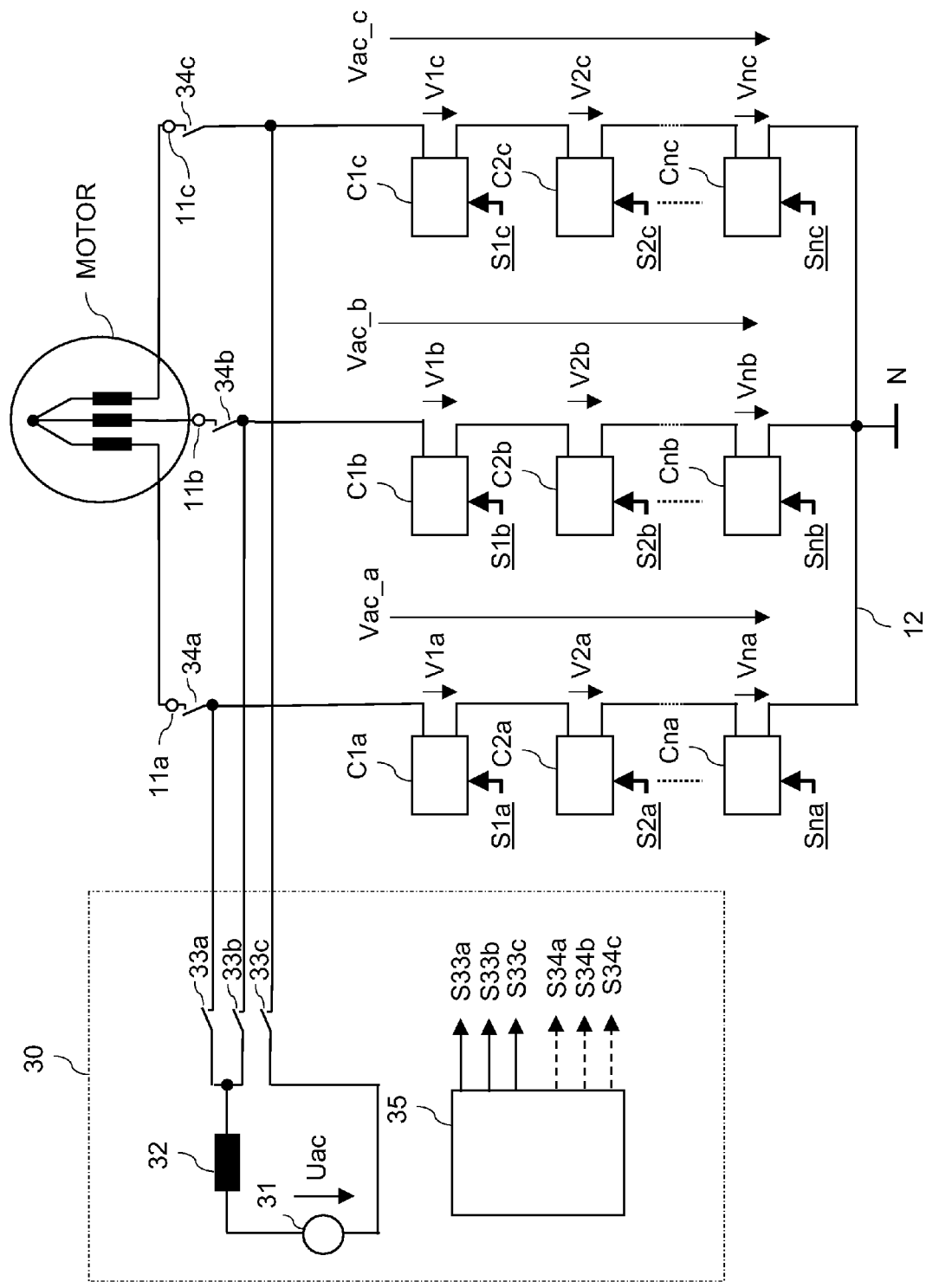
FIG. 13 illustrates a fourth embodiment of a circuit arrangement having a multi-level converter and having a charging circuit coupled to the multi-level converter.

In the embodiment according to FIG. 12 the supply voltage arrangement 30 is connected between the three phase-outputs 11a, 11b, 11c and the second output terminals 12 of the converter branches. FIG. 13 illustrates an embodiment in which the voltage supply arrangement 30 is only connected to the phase outputs 11a, 11b, 11c, where a first terminal of the supply voltage source 31 is connected via the inductor 32 and two parallel switches 33a, 33b to the first and second phase-output 34a, 34b, while a second terminal of the supply voltage source 31 is connected to the third phase output 11c via third switch 33c. In this arrangement a charging current flows from the supply voltage source across one of the first and second phase-outputs 11a, 11b through at least one of the first and second converter branches and the third converter branch C1c-Cnc to the supply voltage source. For this, converter stages of at least one of the first and second converter branches and the third converter branch have to be in the charging state or the bypassing state during the charging process.

FIGS. 12 and 13 illustrate only two of a number of different topologies of the switches 34a, 34b, 34c. According to a further embodiment (not shown), two of the switches, such as switches 33b, 33c are connected between the outputs 11b, 11c and the second terminal of the voltage source 31.

Figure 14:
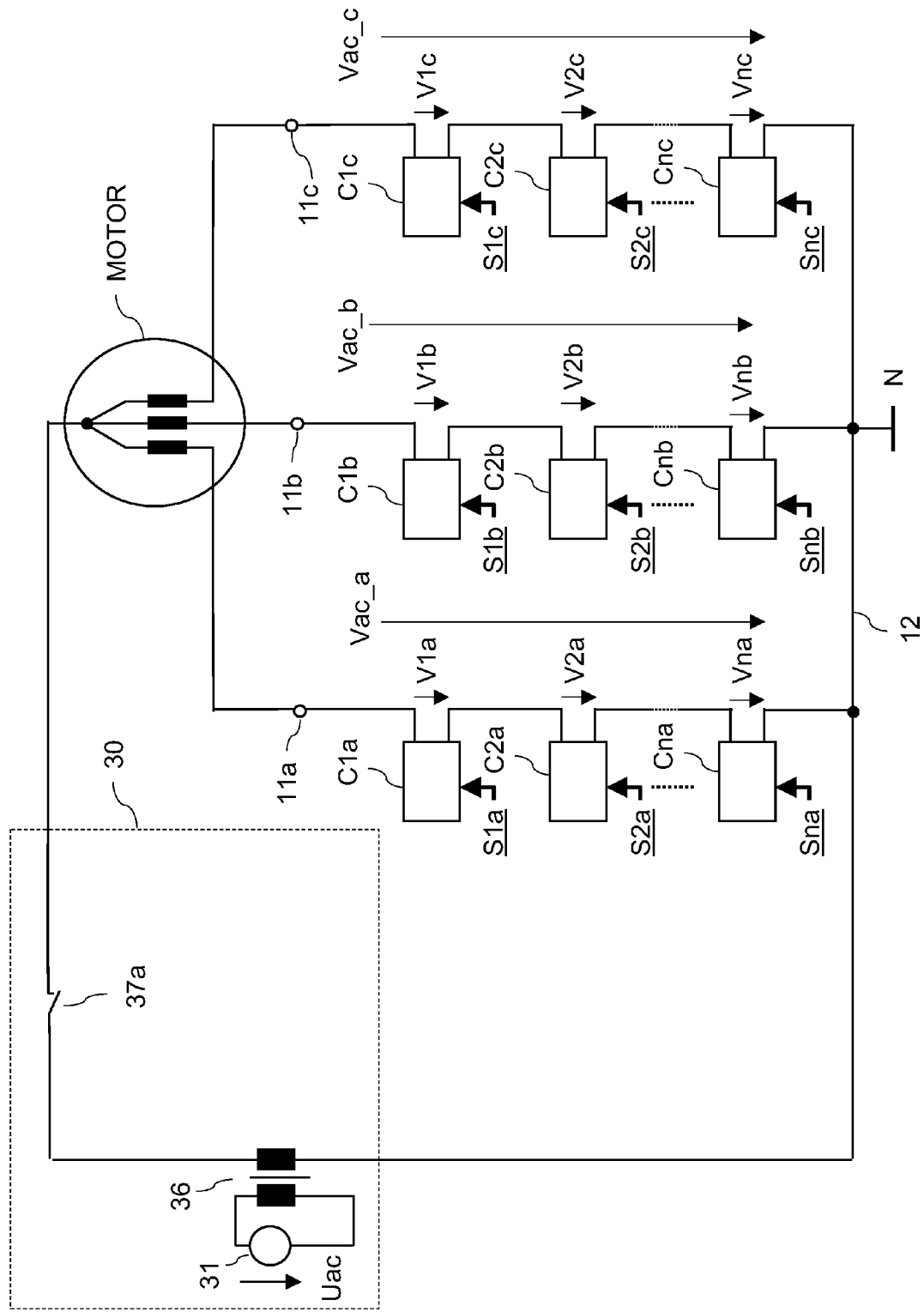
FIG. 14 illustrates a fifth embodiment of a circuit arrangement having a multi-level converter and having a charging circuit coupled to the multi-level converter.

FIG. 14 illustrates an embodiment that is based on the embodiment according to FIG. 10. The embodiment of FIG. 14 is different from the embodiment according to FIG. 10 in that the voltage supply source 31 is connected to the series circuit with the load and multi-level converter arrangement via a transformer 36. Optionally, there is an additional switch 37a connected between the transformer and the load.

Switch 37a disconnects the charging circuit 30 when the motor is driven by the multi-level converter, i.e., when the arrangement is not in the charging mode.

It should be mentioned that each of the embodiments explained before with reference to FIGS. 11 to 13 can be modified by providing a transformer between the supply voltage source and the remaining circuit parts of the voltage supply circuit. In the arrangement according to FIG. 11 the transformer would have to be inserted between the voltage supply source 31 and the AC/DC converter, in the embodiment according to FIG. 12 the transformer would have to be provided between the supply voltage source and the inductor 32, and in the embodiment according to FIG. 13 the transformer would have to be inserted between the supply voltage source 31 and the inductor 32. The function of the transformer is to galvanically isolate the voltage supply source and the load arrangement that includes the multi-level converter and the load.

Figure 15:
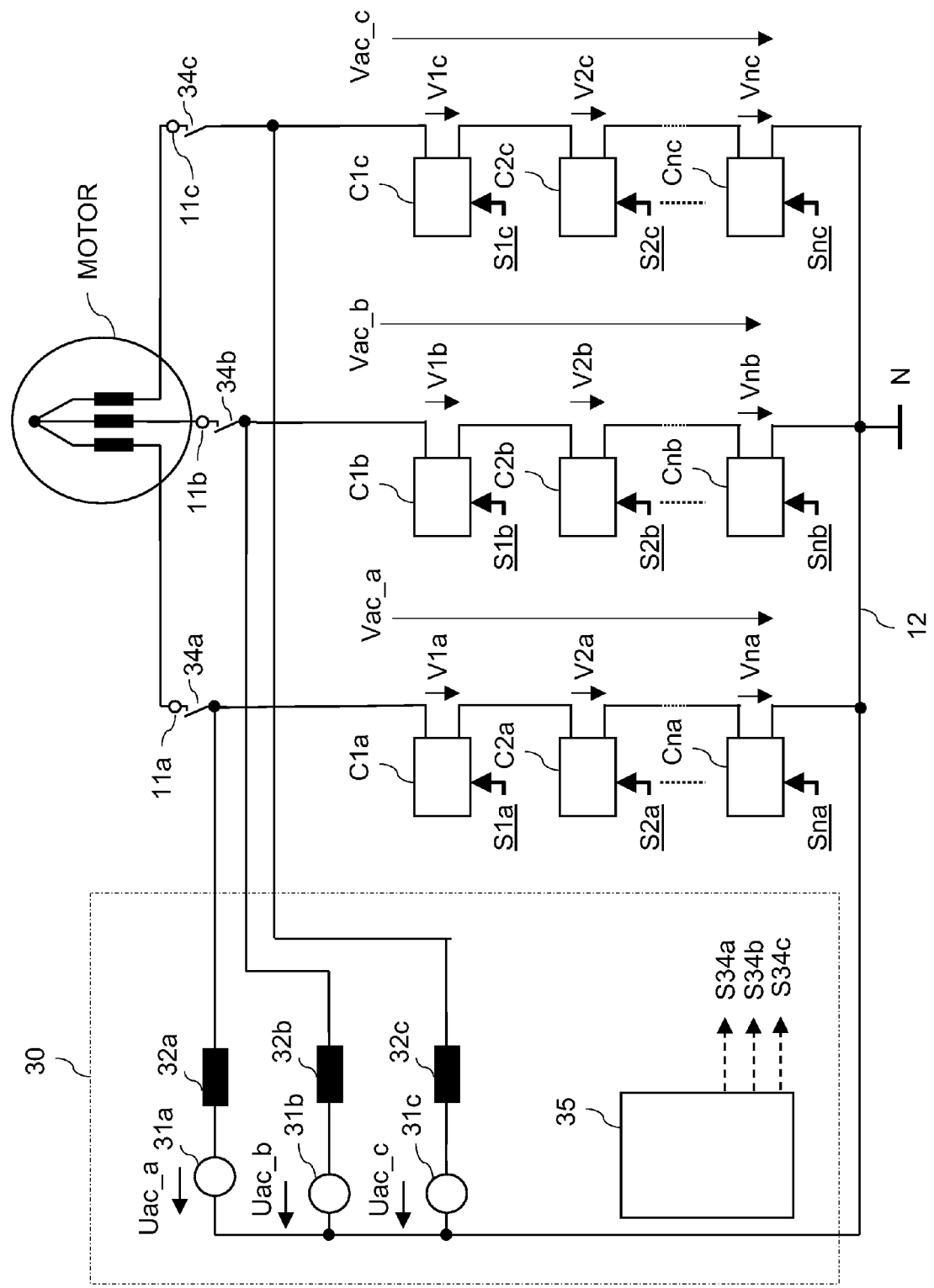
FIG. 15 illustrates a sixth embodiment of a circuit arrangement having a multi-level converter and having a charging circuit coupled to the multi-level converter.

FIG. 15 illustrates an embodiment of the voltage supply circuit 30 that is based on the voltage supply circuit according to FIG. 12 with the difference, that in the embodiment according to FIG. 15 a series circuit with a supply voltage source 31a and an inductor 32a is connected between the second terminals 12 of the converter branches and each of the phase outputs 11a, 11b, 11c. Each of the supply sources 31a, 31b, 31c may represent one phase of a three-phase supply voltage grid. Each of the series circuits serves for charging the charge storage units of one converter branch. The charging process is controlled by the control circuit 60 that generates the control signals for the individual converter stages (the control circuit 60 is not illustrated in FIG. 15). Like in the embodiment illustrated in FIG. 14 a transformer (not shown) could be arranged between each of the supply voltage source 31a, 31b, 31c and the inductor 32a, 32b, 32c.

Figure 16:
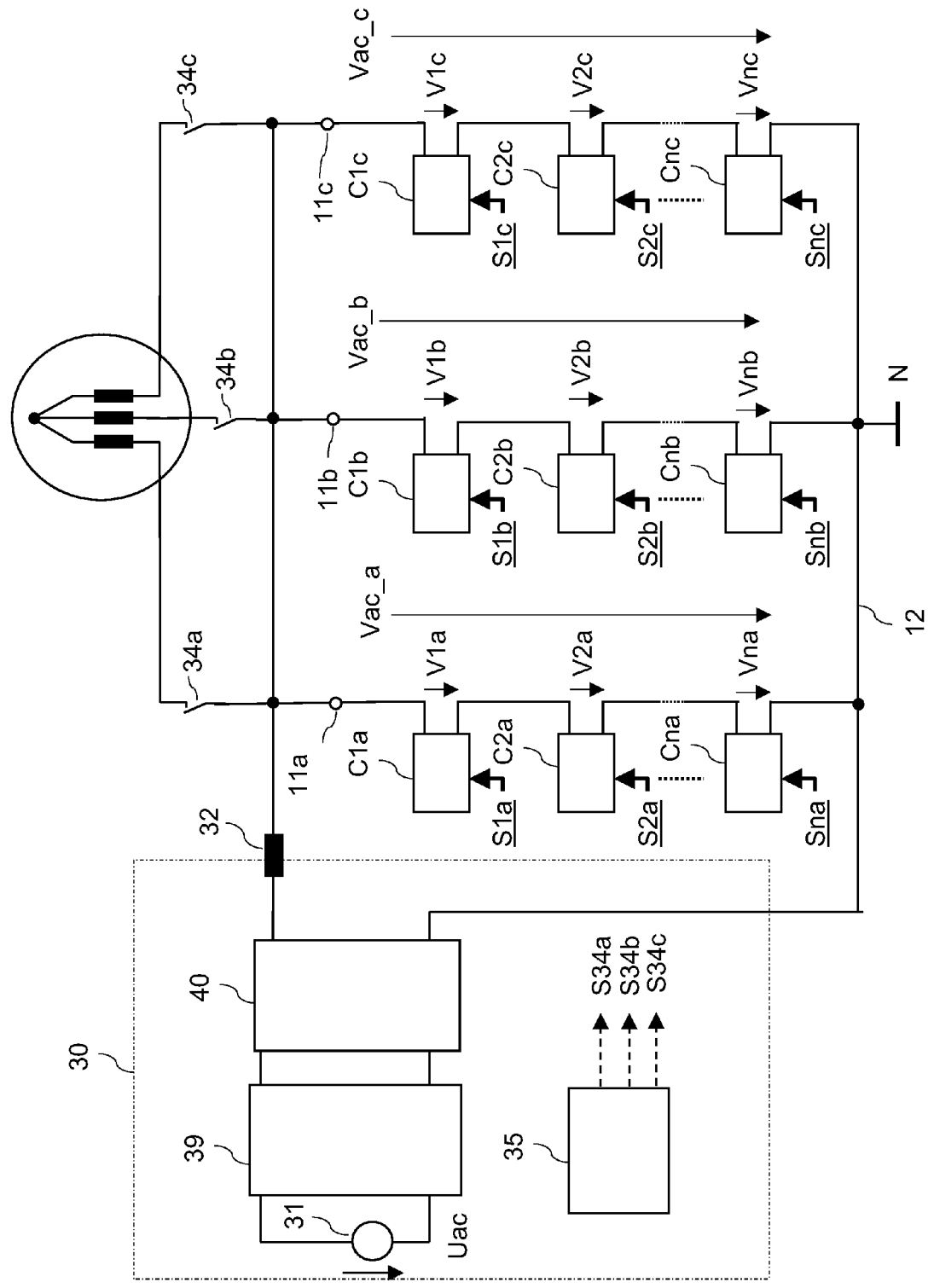
FIG. 16 illustrates a seventh embodiment of a circuit arrangement having a multi-level converter and having a charging circuit coupled to the multi-level converter.

The embodiment according to FIG. 16 is based on the embodiment according to FIG. 12, with the difference, that the supply voltage source 31 via one inductor 32 is connected to each of the phase outputs 11a, 11b, 11c. The AC/DC converter and the DC/DC converter that are connected between the inductor 32 and the supply voltage source are optional.

Figure 17:
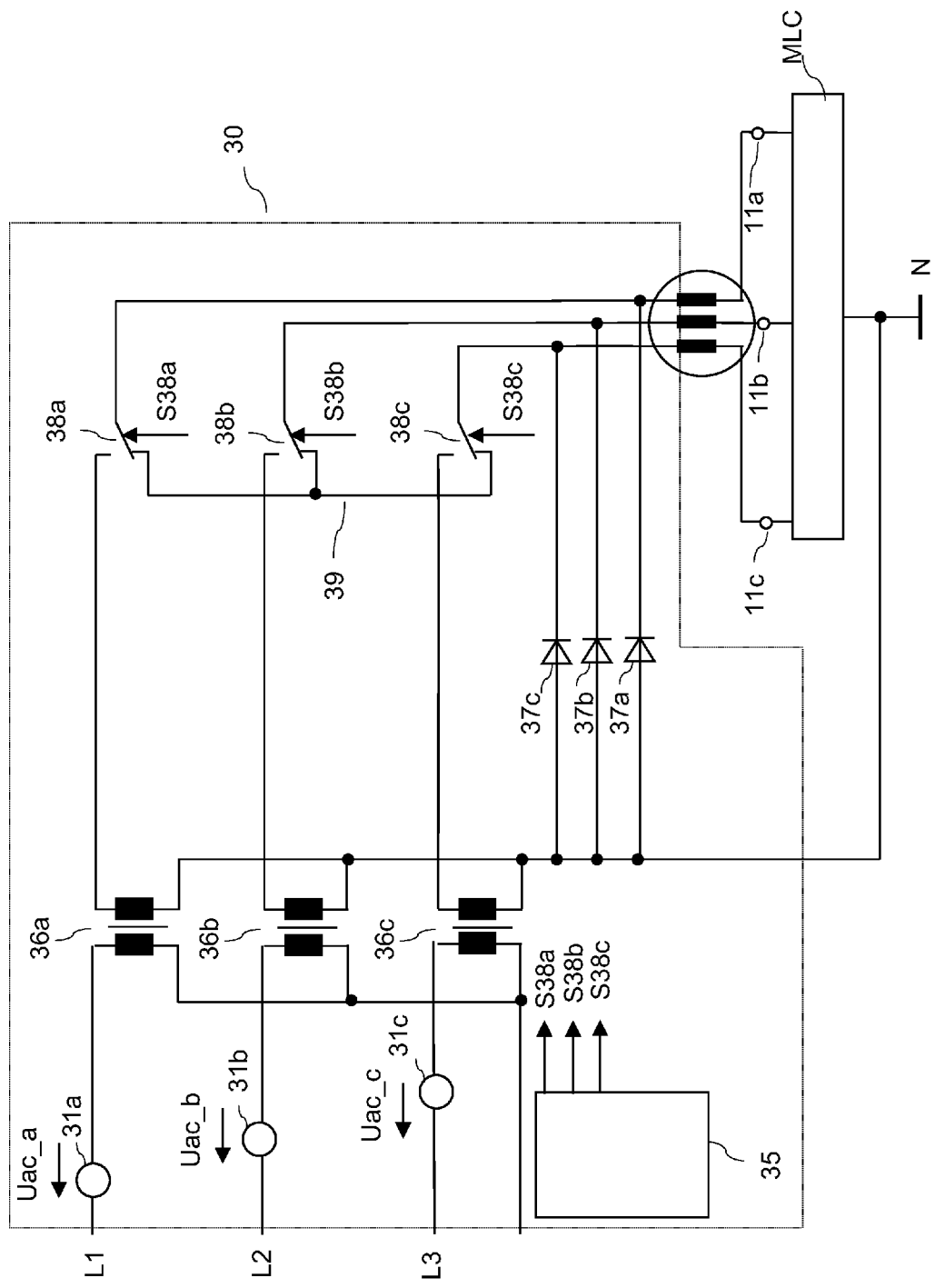
FIG. 17 illustrates a further embodiment of a circuit arrangement having a multi-level converter and having a charging circuit coupled to the multi-level converter.

FIG. 17 illustrates a further embodiment of a voltage supply circuit. In FIG. 17 reference character MLC denotes a 3-phase multi-level converter arrangement that is connected between the phase-outputs 11a, 11b, 11c and the node N for reference potential. The multi-level converter arrangement MLC is, e.g., implemented in accordance with the multi-level converter arrangements according to FIGS. 10 to 16.

In the embodiment of FIG. 17 a charging circuit 30 is coupled to the load, which is a motor in the present example, and via the load is coupled to the multi-level converter arrangement MLC. Charging circuit 30 includes a switch arrangement having three switches 38a, 38b, 38c. Each of these switches is connected to one of the motor windings and is adapted to either couple the corresponding motor winding to a supply voltage source 31a, 31b, 31c or to a circuit node 39 that forms a center tap of the motor. Switches 38a, 38b, 38c are controlled via control signals S38a, S38b, S38c by a control circuit 35. When the MLC arrangement is in the supply mode, i.e., supplies a supply voltage to the load, the switches 38a, 38b, 38c are controlled to connect the motor windings permanently to center tap 39. When the MLC arrangement is in the charging mode, i.e., receives electrical energy via the output terminals, the switches 38a, 38b, 38c are controlled to connect each of the motor windings alternatingly to one of the supply voltage sources 31a, 31b, 31c and the center tap. The three sources 31a, 31b, 31c illustrated in FIG. 17 may represent the three phases of a 3-phase power grid.

In the embodiment of FIG. 17 switches 38a, 38b, 38c are coupled to the voltage sources 31a, 31b, 31c via optional transformers 36a, 36b, 36c.

The charging circuit 30 further includes a rectifier element 37a, 37b, 37c, such as a diode, connected between the reference potential node N and each of the windings. These rectifier elements act as freewheeling elements during the charging process.

When the multi-level converter arrangement MLC is in the charging mode switches 38a, 38b, 38c alternatingly switch between the voltage sources 31a, 31b, 31c and the center tap 39. When one of the voltage sources 31a, 31b, 31c is connected to one of the motor windings and the converter stages in the converter branch that is connected to the respective motor winding are in the bypass or charging mode, then a charging current flows from the voltage source, 31a, 31b, 31c via the switch 38a, 38b, 38c, the motor winding and the converter branch. When the switch disconnects the voltage source 31a, 31b, 31c then the rectifier elements allow a freewheeling current to flow, i.e., allow a current to further flow through the motor winding and the converter branch.

Optionally, switches 38a, 38b, 38c have a third switching position that opens the switches. In the charging mode the switches 38a, 38b, 38c alternatingly switch then between the voltage sources 31a, 31b, 31c and the motor windings, and do only connect the motor windings to the center tap 39 when the multi-level converter arrangement MLC provides a supply voltage to the load.

Figure 18:
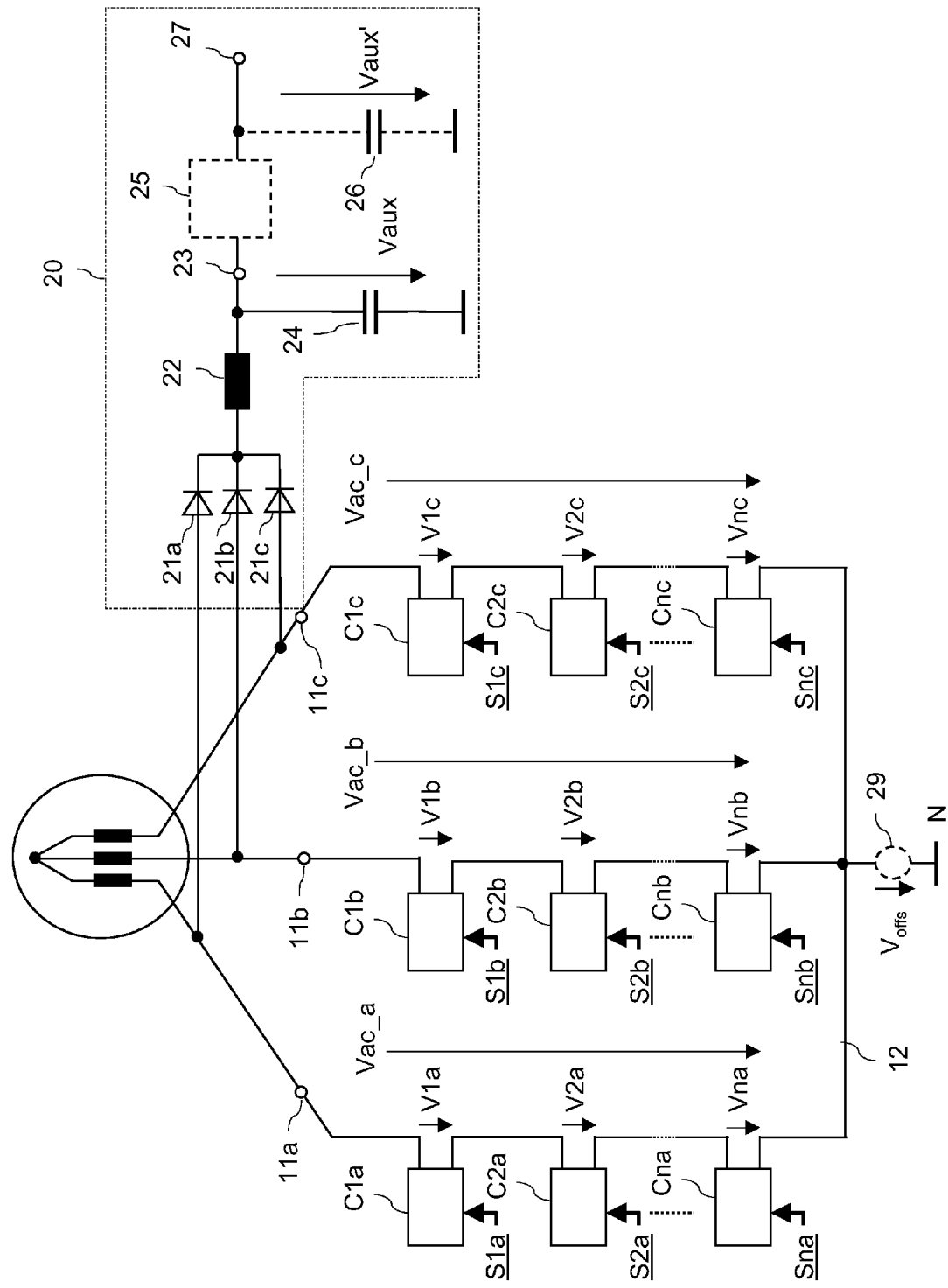
FIG. 18 illustrates a first embodiment of a circuit arrangement having a multi-level converter and having output terminals for providing an auxiliary supply voltage.

FIG. 18 illustrates an embodiment of the converter arrangement that includes an auxiliary voltage generation circuit that is coupled to the phase outputs 11a, 11b, 11c. The auxiliary voltage generation circuit includes a rectifier having an inductor 22 and a capacitor 24 connected in series, where an auxiliary voltage Vaux is present across the capacitor 24. Each of the phase outputs 11a, 11b, 11c is connected to the rectifier arrangement 22, 24 via a rectifier element 21a, 21b, 21c, such as a diode. The voltage generation circuit 20 according to FIG. 18 generates a DC auxiliary voltage from the output voltages present at the phase outputs 11a, 11b, 11c. Optionally a DC/DC converter 25 is connected to the output 23 and provides a controlled DC auxiliary output voltage Vaux' at a second output 27 across a further capacitor 26.

Optionally an offset voltage source 29 is connected between reference potential node N and the second output terminals of the converter branches. An offset voltage $V_{offs}$ provided by voltage source 29 does not influence the motor drive but contributes to a constant voltage offset of the auxiliary DC voltage Vaux.

Figure 19:
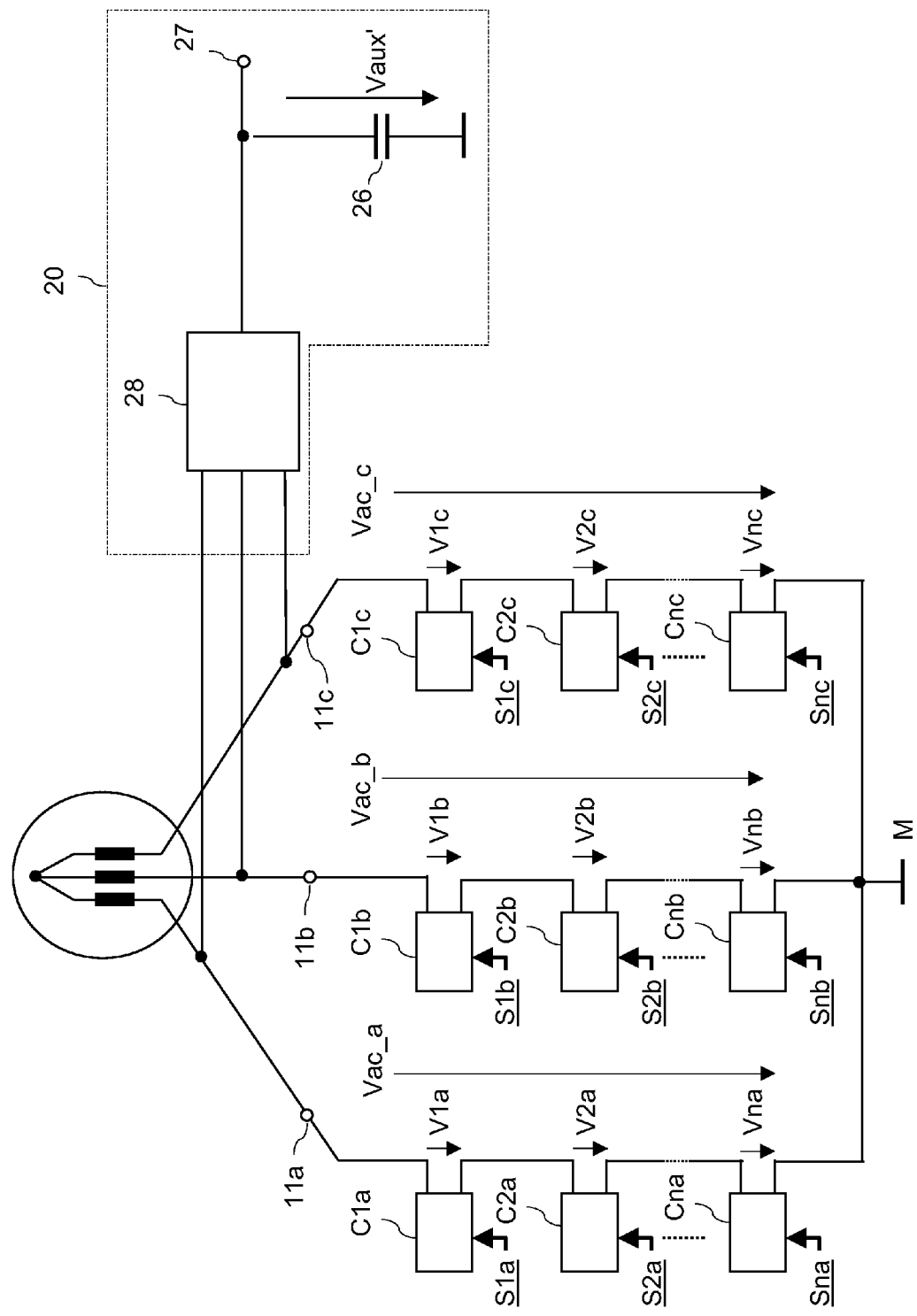
FIG. 19 illustrates a second embodiment of a circuit arrangement having a multi-level converter and having output terminals for providing an auxiliary supply voltage.

FIG. 19 illustrates a further embodiment of a voltage generation circuit 20 connected to the phase outputs 11a, 11b, 11c. This voltage generation circuit includes a multi-phase AC/DC converter 28, such as a multi-phase Power Factor Controller that provides a controlled DC auxiliary voltage Vaux' across a capacitor 26 connected between the converter 28 and a reference potential terminal.

In the converter arrangements explained hereinbefore the same terminal, such as terminals 11a, 11b, 11c, serves to provide a supply voltage to a load, when the converter arrangement is in the supply mode, and serves to receive electrical energy, when the converter arrangement is in the charging mode. In embodiments where the converter arrangement is not charged via the load, such as in the arrangements of FIGS. 12, 13, 15 and 16 that have switches to disconnect the load during the charging process, the converter arrangement, controlled by control circuit 20, could be adapted to feed electrical energy back to the voltage source, such as an electrical power grid. Feeding electrical energy back into the power grid may help to correct or to compensate for Power Factor variations caused by other loads connected to the power grid. In this case control circuit 20 is adapted to measure the power factor on the grid, and is adapted to cause the converter arrangement to feed energy back into the power grid in order to correct the Power Factor.

The arrangement is particularly capable of providing a Power Factor Compensation (PFC) because the output voltage Vac is not restricted to be an oscillating voltage, but may be a voltage having any desired waveform, where the maximum amplitude of the output voltage is restricted by the number of converter stages and the maximum output voltage of each converter stage.

An active charge balancing of the electrical charge in the charge storage units is possible in each of the three modes of operation: in the supply mode, when a supply voltage is provided to the load; in the charging mode, when electrical charge is stored in the charge storage unit; in the Power Factor Correction (PFC) mode, when electrical energy is fed back into the power grid.

Finally it should be mentioned that features that have been explained with reference to one embodiment can be combined with features of other embodiments, even if this has not explicitly mentioned hereinabove.

What is claimed is:

1. A method of operating a multi-level converter comprising a plurality of series connected converter units that each include an electrical charge storage unit and a switch arrangement, the method comprising:
   detecting a charge state of the charge storage units of the converter units;
   providing a set of parameter sets dependent on a desired output voltage waveform, wherein at least one parameter set defines a fixed duty-cycle;
   assigning the parameter sets to the converter units based on the detected charge states, assigning comprising assigning the at least one parameter set to one converter unit for a duration of at least one half-cycle of an AC output voltage;

generating control signals coupled to the switch arrangements of the plurality of series connected converter units, wherein the generating is based on the set of parameter sets;

generating an output voltage for each of the plurality of series connected converter units based on the control signals, wherein the generating the output voltage comprises providing a voltage amplitude level of one of two different voltage amplitude levels in accordance with the fixed duty cycle; and providing the AC output voltage at output terminals of the multi-level converter based on generating the output voltage for each of the plurality of series connected converter units.

2. The method of claim 1, wherein assigning the parameter set further comprising changing parameter set assignments over time.

3. The method of claim 1, wherein assigning the parameter sets further comprises assigning the a parameter set is assigned to a converter unit at least for a duration of a discharge cycle, wherein the duration of the discharge cycle is dependent on the desired output voltage waveform.

4. The method of claim 3, wherein the output voltage is a sinusoidal voltage that has a positive and a negative half-cycle, and wherein the duration of one discharge cycle equals a duration of one half-cycle.

5. The method of claim 3, wherein assigning parameter sets to the converter units further comprises cyclically varying parameter assignments.

6. The method of claim 3, wherein assigning parameter sets to the converter units further comprises randomly varying parameter assignments.

7. The method of claim 3, further comprising bypassing at least one converter stage based on the detected charge state of the charge storage unit of the converter unit.

8. The method of claim 1, wherein assigning the parameter sets further comprises assigning the parameter sets to the converter units such that a lower single duty-cycle assigned to a first converter unit corresponds to a lower detected charge state of the charge storage unit of the first converter unit.

9. The method of claim 1, wherein detecting charge state comprises measuring output voltages of the charge storage units; evaluating input and output currents of the charge storage units; and/or evaluating temperature so of the charge storage units.

10. The method of claim 1, wherein the converter unit comprises at least three converter branches, and each converter branch has at least two converter units connected in series and having a first output terminal.

11. The method of claim 1, wherein at least one of the two different voltage amplitude levels comprises a positive voltage level and a negative voltage level.

12. A method of operating a multi-level converter comprising a plurality of series connected converter units that each include an electrical charge storage unit and a switch arrangement, the method comprising:

detecting a charge state of the charge storage units of the converter units;

providing a set of parameter sets dependent on a desired output voltage waveform, wherein at least one parameter set defines a fixed duty-cycle;

assigning the parameter sets to the converter units based on the detected charge states, assigning comprising assigning the at least one parameter set to one converter unit for a duration of at least one half-cycle of an AC output voltage;

generating control signals coupled to the switch arrangements of the plurality of series connected converter units, wherein the generating is based on the set of parameter sets, wherein the control signals cause each converter unit to provide a voltage amplitude level of one of two different voltage amplitude levels in accordance with the fixed duty cycle; and charging the charge storage units of the converter units.

13. The method of claim 12, wherein the charging the charge storage units comprises applying a supply voltage to the charge storage units.

14. The method of claim 13, wherein applying the supply voltage comprises supplying an AC supply voltage.

15. The method of claim 12, further comprising:

selectively providing a first set of parameter sets to the converter unit that configures the multi-level converter to provide a supply voltage at output terminals of the multi-level converter; and selectively providing a second set of parameter sets to the converter unit that configured the multi-level converter to store electrical energy received via the voltage supply terminals in at least one of the charge storage units.

16. The method of claim 15, wherein the first set of parameter sets is dependent on the output voltage, and wherein the second set of parameter sets is at least dependent on the detected charging states of the charge storage units.

17. The method of claim 16, wherein the second set of parameter sets is dependent on a supply voltage applied to the charge storage units.

18. A method of generating an AC voltage, the method comprising:

detecting a charge state of charge storage units disposed within corresponding series connected converter units;

assigning parameter sets to the converter units based on the detected charge states, assigning comprising assigning at least one parameter set to one converter unit for a duration of at least one half-cycle of an AC output voltage, wherein the parameter sets are based on a desired output voltage waveform, and the at least one parameter set defines a fixed duty cycle; and generating control signals coupled to switch arrangements coupled the charge storage units based on the assigned parameter sets, the control signals configured to cause each converter unit to provide a voltage amplitude level of one of two different voltage amplitude levels in accordance with the fixed duty cycle.

19. The method of claim 18 further comprising charging the charge storage units.

20. The method of claim 18, wherein at least one of the two different voltage amplitude levels comprises a positive voltage level and a negative voltage level.

* * * * *